(12) United States Patent
Sin et al.

(10) Patent No.: US 6,744,608 B1
(45) Date of Patent: Jun. 1, 2004

(54) METHOD AND SYSTEM FOR MAKING TMR JUNCTIONS

(75) Inventors: Kyusik Sin, Pleasanton, CA (US); Kristian M. Bjelland, Fremont, CA (US); Benjamin Chen, San Jose, CA (US); Hugh C. Hiner, Fremont, CA (US); Xizeng Shi, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 86 days.

(21) Appl. No.: 10/146,517

(22) Filed: May 14, 2002

(51) Int. Cl.[7] .............................. G11B 5/127; G11B 5/39
(52) U.S. Cl. ................................................. 360/324.2
(58) Field of Search ..................... 360/324.2, 324.1, 360/324.11, 324.12

(56) References Cited

U.S. PATENT DOCUMENTS 5,768,071 A * 6/1998 Lin ..................... 360/324.11
5,898,548 A * 4/1999 Dill et al. ............... 360/324.2
6,529,353 B2 * 3/2003 Shimazawa ............. 360/324.2

* cited by examiner

Primary Examiner—George J. Letscher
(74) Attorney, Agent, or Firm—Sawyer Law Group LLP

(57) ABSTRACT

A method and system for providing a tunneling magnetoresistive sensor is disclosed. The method and system include providing a pinned layer, a free layer and an insulating layer between the pinned and free layers. The pinned and free layers are ferromagnetic. The method and system also include providing a hard mask layer to be used in defining the sensor at the top of the tunneling magnetoresistive sensor. The method and system also include using the hard mask layer to define the tunneling magnetoresistive sensor. Thus, the pinned layer, the free layer and the insulating layer are capable of having a minimum dimension of less than 0.2 μm.

12 Claims, 20 Drawing Sheets

METHOD AND SYSTEM FOR MAKING TMR JUNCTIONS

FIELD OF THE INVENTION

The present invention relates to magnetic memory systems, and more particularly to a method and system for providing tunneling magnetoresistive sensors that could be used in magnetic memory systems.

BACKGROUND OF THE INVENTION

Magnetic memories are often used in storing data. One type of memory currently of interest utilizes tunneling magnetoresistive ("TMR") sensors in the memory cells. A TMR sensor typically includes two ferromagnetic layers separated by a thin insulating layer. The insulating layer is thin enough to allow charge carriers to tunnel between the ferromagnetic layers. One ferromagnetic layer has its magnetization fixed, or pinned, in place. This is typically accomplished using an antiferromagnetic layer. The other ferromagnetic layer has a magnetization that can rotate in response to an applied magnetic field. The resistance of the TMR sensor depends upon the orientation of the magnetic tunneling junctions. Thus in order to store data in the TMR sensor or MRAM, one or two magnetic fields are applied to rotate the magnetization of one of the layers. Typically, the magnetization of one ferromagnetic layer will be rotated to be parallel or anti-parallel relative to the magnetization of the other ferromagnetic layer. The TMR sensor will thus be in either a low resistance (magnetizations parallel) or a high resistance (magnetizations antiparallel) state. The TMR sensor can thus be used to store data. A signal corresponding to the resistance is developed in order to indicate the type of data stored.

FIG. 1 is a flow chart depicting a conventional method 10 for fabricating the TMR sensor. FIGS. 2A–2E depict a conventional TMR sensor during fabrication. Referring to FIGS. 1 and 2A–2E, the method 10 commences after the layers for the TMR sensor have been deposited. Thus, the method 10 starts after the free layer, the tunneling barrier and the pinned layer and antiferromagnetic layer which pins the magnetization of the pinned layer, have been provided on a bottom lead layer. A conventional bilayer structure is provided, via step 12. FIG. 2A depicts the conventional TMR structure 50 after step 12 has been performed. The TMR layers 54 reside on a bottom lead 52. The TMR layers include an antiferromagnetic layer, a ferromagnetic pinned layer, a tunneling barrier (a thin insulating layer) and a ferromagnetic free layer. Also depicted is the conventional bilayer structure 56 that includes a PMGI layer 55 and a larger photoresist layer 57.

Using the conventional bilayer structure 56 as a mask, the TMR sensor is defined, via step 14. FIG. 2B depicts the conventional TMR structure 50 after the conventional TMR sensor 60 has been defined. A dielectric layer is provided, via step 16. FIG. 2C depicts the TMR structure 50 after the dielectric layer has been deposited. The dielectric layer includes regions 62A and 62B on either side of the conventional TMR sensor 60 as well as a region 62C that lies on the conventional bilayer structure 56. The conventional bilayer structure 56 is lifted off, via step 18. FIG. 2D depicts the conventional TMR structure 50 after the conventional bilayer structure 56 has been removed. A top lead is provided, via step 20. FIG. 2E depicts the conventional TMR structure 50 after the top lead 64 has been provided.

Although the conventional method 10 provide the conventional TMR sensor 60, one of ordinary skill in the art will readily recognize that the conventional bilayer structure 56 may limit the size of the TMR sensor that can be provided. The bilayer photoresist structure 56 requires an undercut of approximately 0.05 $\mu$m on each edge. The undercut is utilized to ensure that the conventional bilayer structure 56 can be lifted off. For smaller TMR sensors, the conventional bilayer structure 56 may easily be inadvertently removed before steps 16 and 18 are completed. This is particularly true for TMR sensors 60 which have a minimum dimension of 0.2 $\mu$m in length or less. Thus, it becomes difficult to fabricate smaller devices having a minimum dimension of approximately 0.2 $\mu$m or less. For such devices, the yield decreases. In addition, electrostatic discharge damage and particle contamination also become an issue for device made using the conventional method 10. Consequently, it is difficult to fabricate smaller TMR sensor 60.

Accordingly, what is needed is a system and method for providing a shorter TMR sensor. The present invention addresses such a need.

SUMMARY OF THE INVENTION

A method and system for providing a tunneling magnetoresistive sensor is disclosed. The method and system include providing a pinned layer, a free layer and an insulating layer between the pinned and free layers. The pinned and free layers are ferromagnetic. The method and system also include providing a hard mask layer to be used in defining the sensor at the top of the tunneling magnetoresistive sensor. The method and system also include using the hard mask layer to define the tunneling magnetoresistive sensor. Thus, the pinned layer, the free layer and the insulating layer are capable of being less than 0.2 $\mu$m in length.

According to the system and method disclosed herein, the present invention provides a smaller tunneling magnetoresistive sensor.

DETAILED DESCRIPTION OF THE INVENTION

The present invention relates to an improvement in magnetic memories. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A method and system for providing a tunneling magnetoresistive sensor is disclosed. The method and system include providing a pinned layer, a free layer and an insulating layer between the pinned and free layers. The pinned and free layers are ferromagnetic. The method and system also include providing a hard mask layer to be used in defining the sensor at the top of the tunneling magnetoresistive sensor. The method and system also include using the hard mask layer to define the tunneling magnetoresistive sensor. Thus, the pinned layer, the free layer and the insulating layer are capable of being less than 0.2 $\mu$m in length.

The present invention will be described in terms of a particular tunneling magnetoresistive (TMR) sensor having certain layers and made from particular materials. However, one of ordinary skill in the art will readily recognize that this method and system will operate effectively for other TMR sensors and/or additional layers and with other materials not inconsistent with the present invention.

Figure 1:
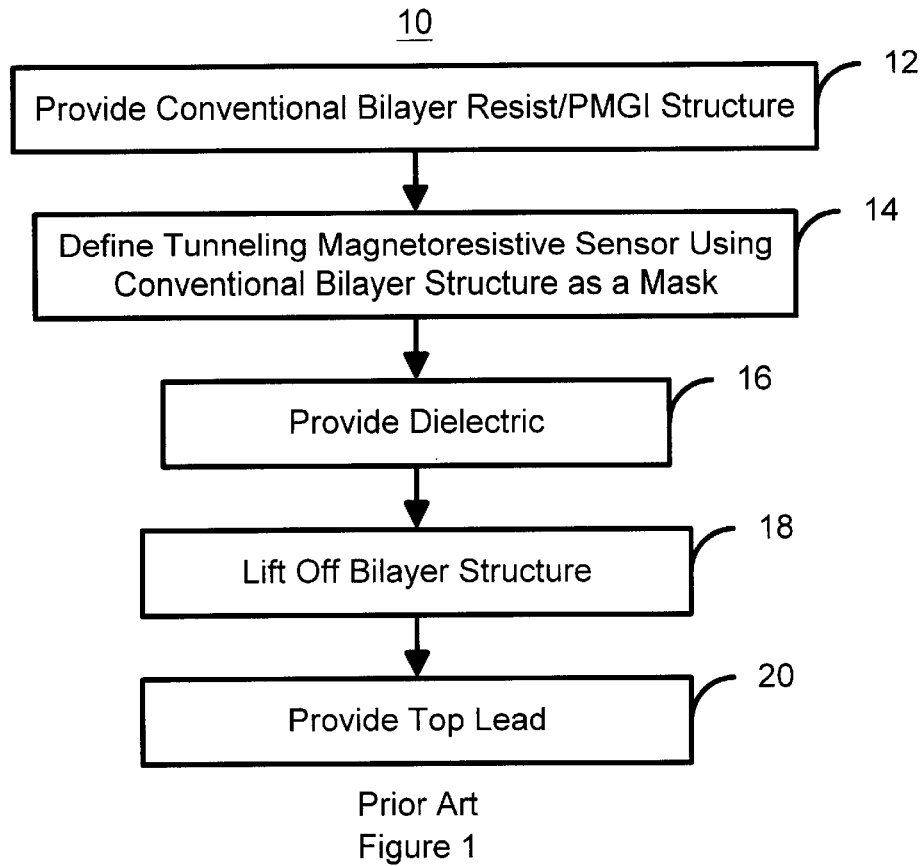
FIG. 1 is a flow chart depicting a conventional method for providing a TMR sensor.
Figure 2A:
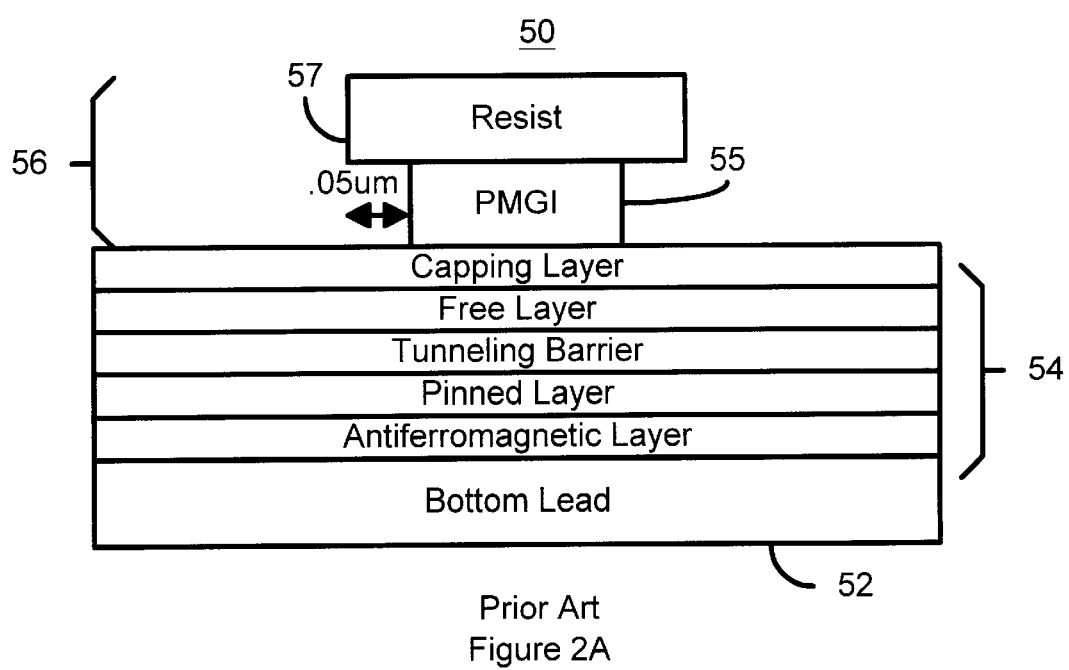
FIGS. 2A–2E depict the conventional TMR sensor during fabrication.
Figure 2B:
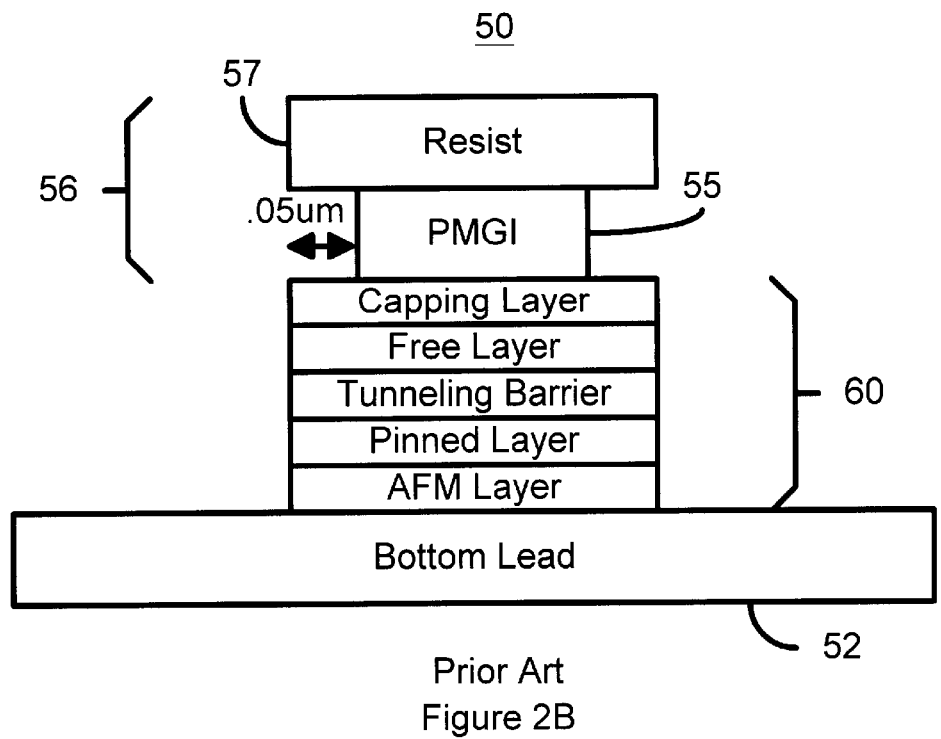
Figure 2C:
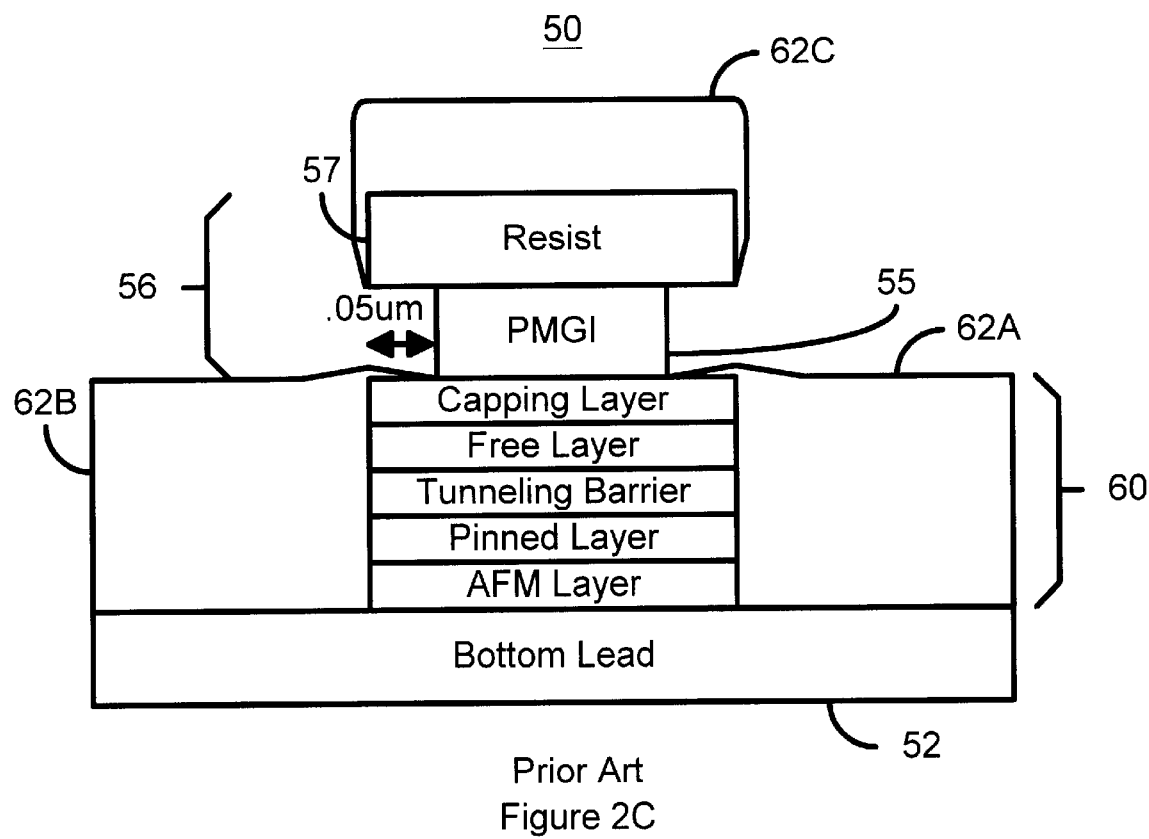
Figure 2D:
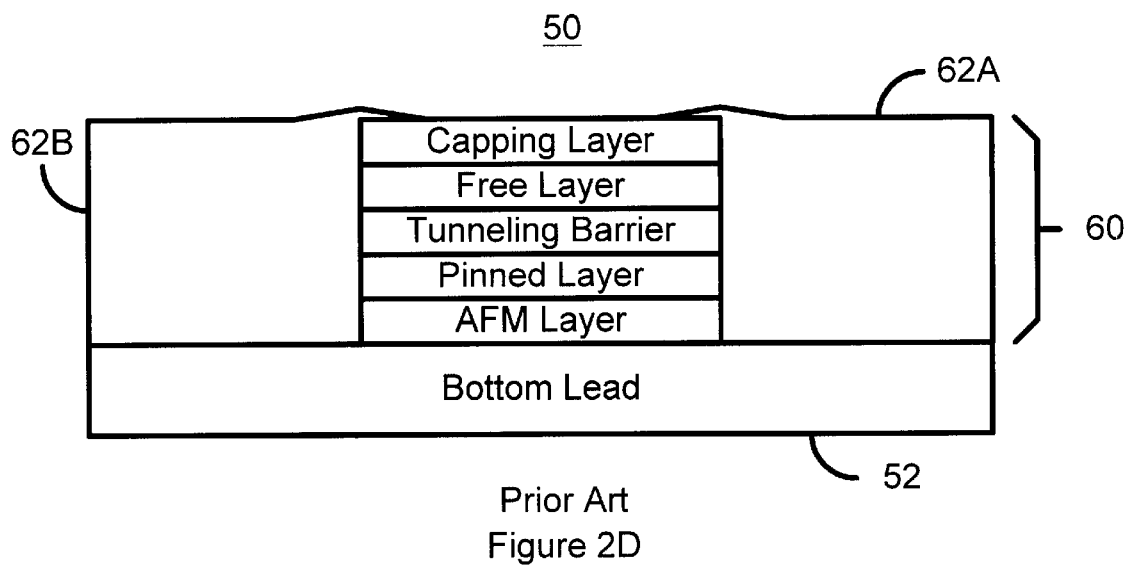
Figure 2E:
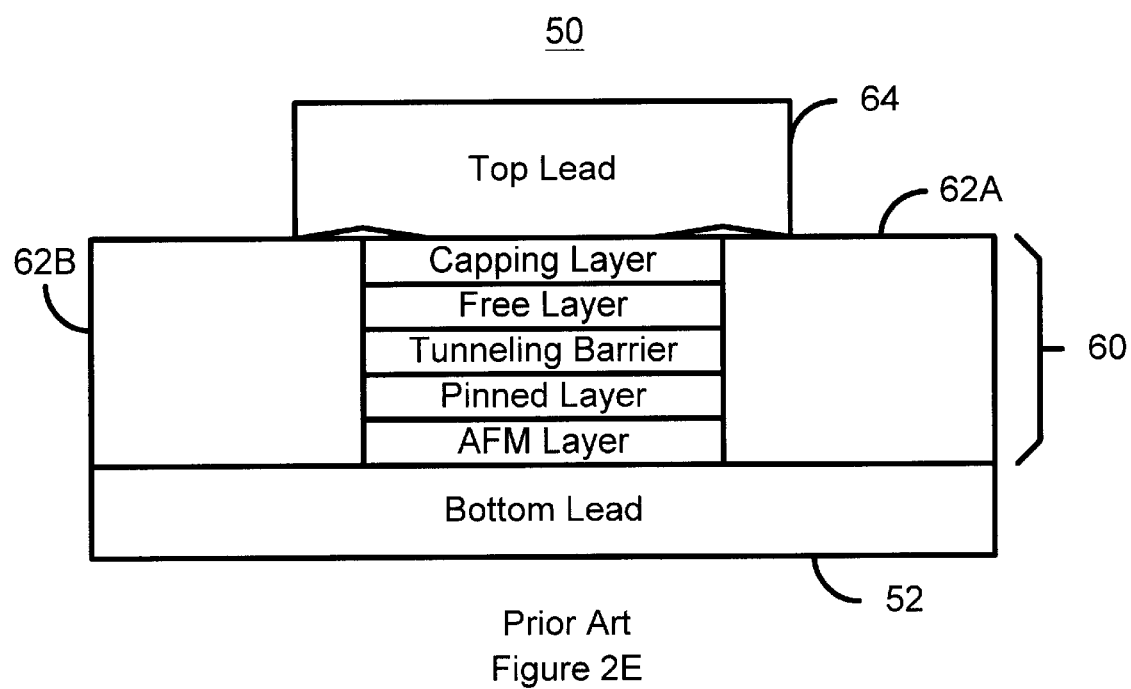
Figure 3:
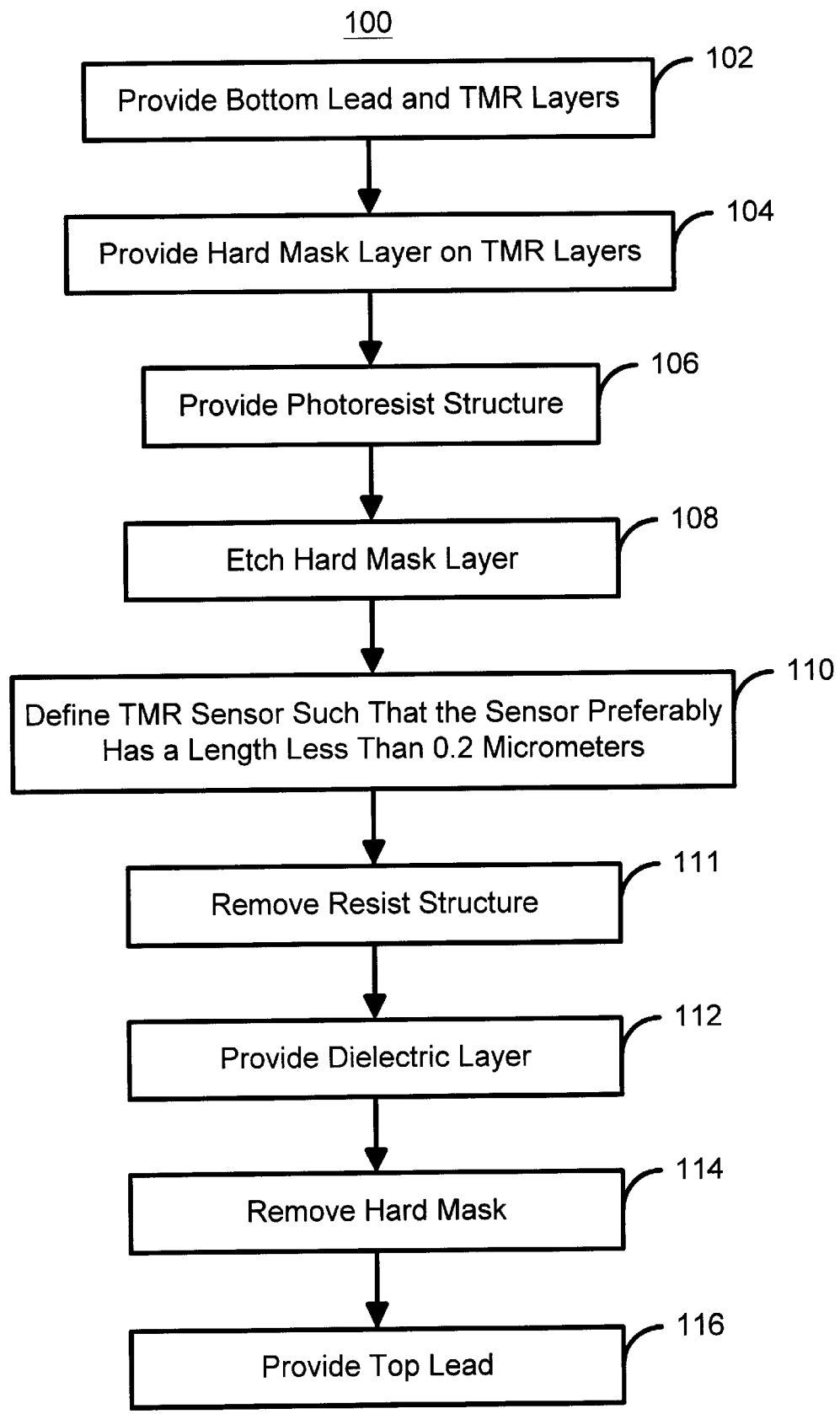
FIG. 3 is a high-level flow chart depicting one embodiment of a method in accordance with the present invention for providing a TMR sensor.

To more particularly illustrate the method and system in accordance with the present invention, refer now to FIG. 3, depicting a high-level flow chart depicting one embodiment of a method 100 in accordance with the present invention for providing a TMR sensor. The bottom lead and the TMR layers are provided, via step 102. Preferably, the TMR layers include at least an antiferromagnetic layer, a pinned layer adjacent to the antiferromagnetic layer, a free layer and an insulating tunneling barrier layer between the pinned layer and the free layer. The pinned layer and the free layer are preferably ferromagnetic. In addition, a capping layer may be provided at the top of the TMR layers.

A hard mask layer is provided, via step 104. If the hard mask layer is to remain as part of the final device, then the hard mask layer is conductive. Otherwise, the hard mask layer may be insulating. A photoresist structure is provided on the hard mask layer, via step 106. The hard mask layer is then etched using the photoresist structure as a mask, via step 108. Thus, a bilayer structure is provided. However, the bilayer structure need not be undercut. The TMR layers are etched to provide the TMR sensor, via step 110. Step 110 is preferably performed using a reactive ion etch or by ion milling. The photoresist structure is removed, via step 111. A dielectric is provided, via step 112. The hard mask layer may be removed, via step 114. The top lead is provided, via step 116.

Because the hard mask is provided in step 104 and used to define the TMR sensor, an undercut bilayer structure including PMGI is not needed to define the TMR sensor. Consequently, smaller TMR sensors can be provided. In a preferred embodiment, the TMR sensor provided is less than 0.2 $\mu$m in length.

Figure 4:
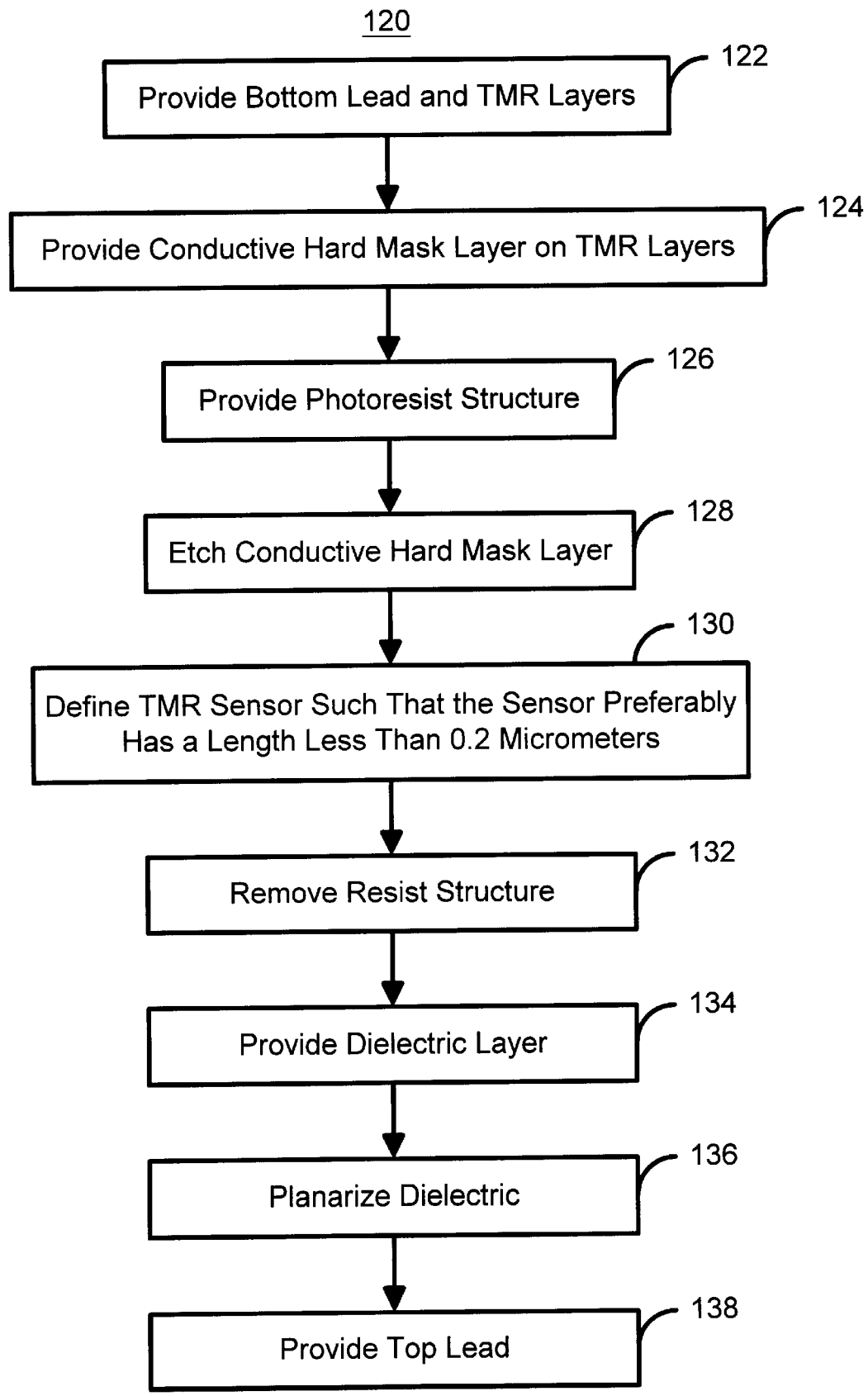
FIG. 4 is a more detailed flow chart depicting one embodiment of a method in accordance with the present invention for providing a TMR sensor.
Figure 5A:
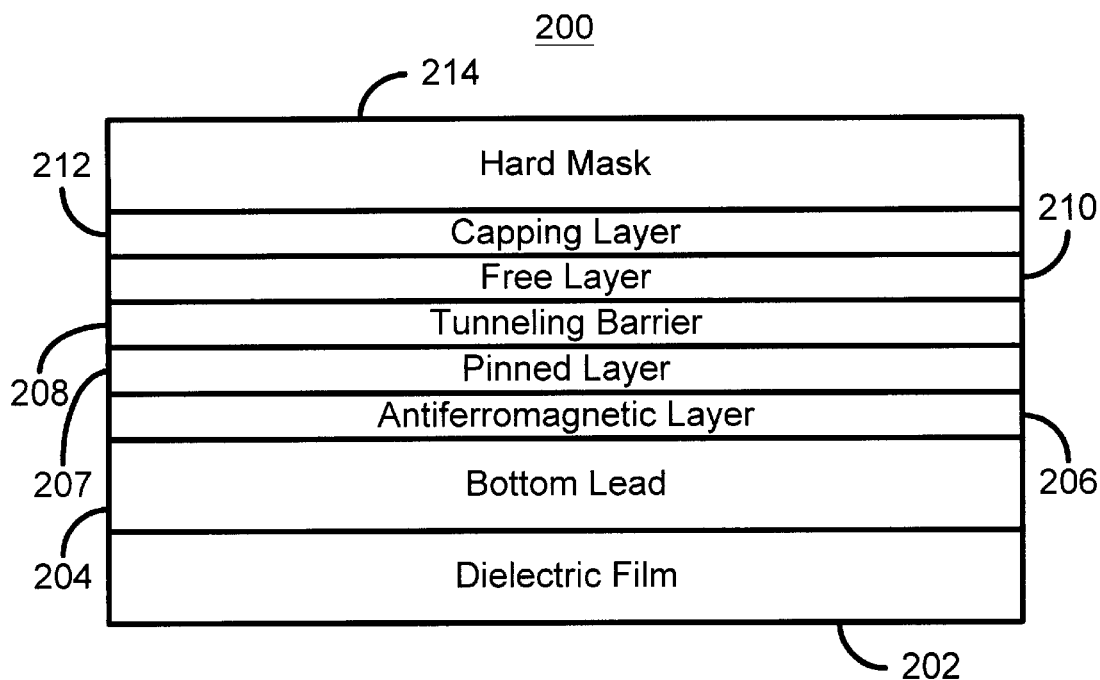
FIGS. 5A–5H depict a first embodiment of a TMR sensor in accordance with the present invention during fabrication.

FIG. 4 is a more detailed flow chart depicting one embodiment of a method 120 in accordance with the present invention for providing a TMR sensor. FIGS. 5A–5E depict a first embodiment of a TMR structure 200 in accordance with the present invention during fabrication using the method 120. The bottom lead and the TMR layers are provided, via step 122. A conductive hard mask layer is provided, via step 124. FIG. 5A depicts a preferred embodiment of the TMR structure 200 in accordance with the present invention after step 124 is performed. The TMR layers are formed on a bottom lead 204 that preferably resides on a dielectric film 202. The TMR layers include at least an antiferromagnetic layer 206, a pinned layer 207 adjacent to the antiferromagnetic layer 206, a free layer 210 and an insulating tunneling barrier 208 between the pinned layer 207 and the free layer 210. The pinned layer 207 and the free layer 210 are preferably ferromagnetic. In addition, a capping layer 212 may be provided at the top of the TMR layers. A conductive hard mask 214 is provided on the capping layer 212. In a preferred embodiment, the conductive hard mask 214 includes Ta, Ti, Cr or TaN.

Figure 5B:
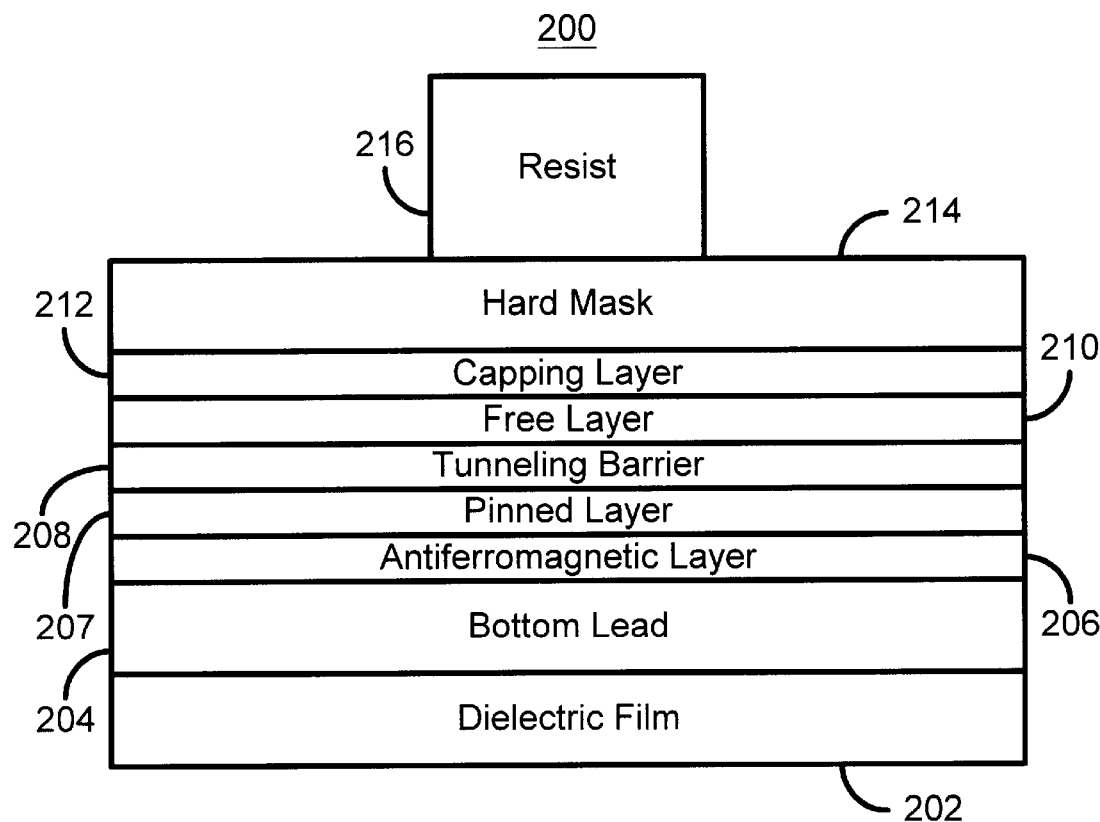
Figure 5C:
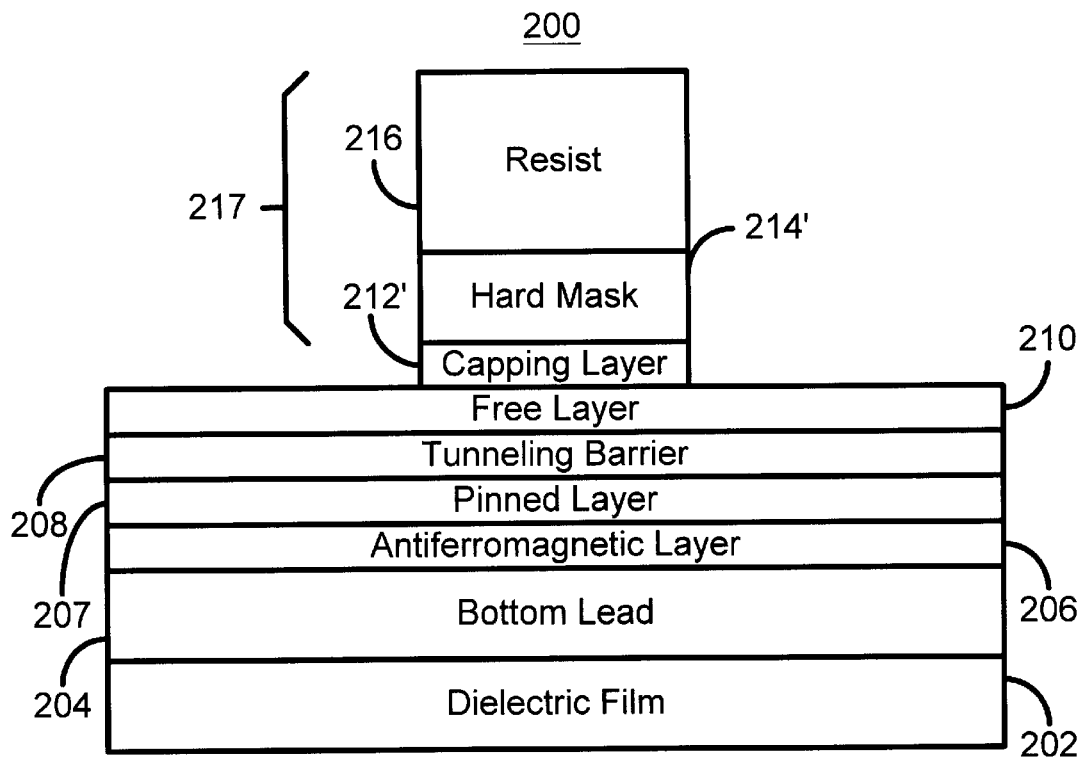

A photoresist structure is provided on the conductive hard mask layer, via step 126. FIG. 5B depicts the TMR structure 200 after the photoresist structure 216 is provided. The photoresist structure 216 is preferably the size desired for providing the TMR sensor. Thus, in a preferred embodiment, the photoresist structure 216 is less than 0.2 $\mu$m in length. The hard mask layer is then etched using the photoresist structure as a mask, via step 128. FIG. 5C depicts the TMR structure 200 after step 128 has been performed. Thus, a bilayer structure 217 formed from the photoresist 216' and the remaining conductive hard mask 214' is provided. However, the bilayer structure 217 need not be undercut. Instead the photoresist 216' and the conductive hard mask 214' have approximately the same dimensions. In a preferred embodiment, the capping layer 212' is also etched in step 128.

Figure 5D:
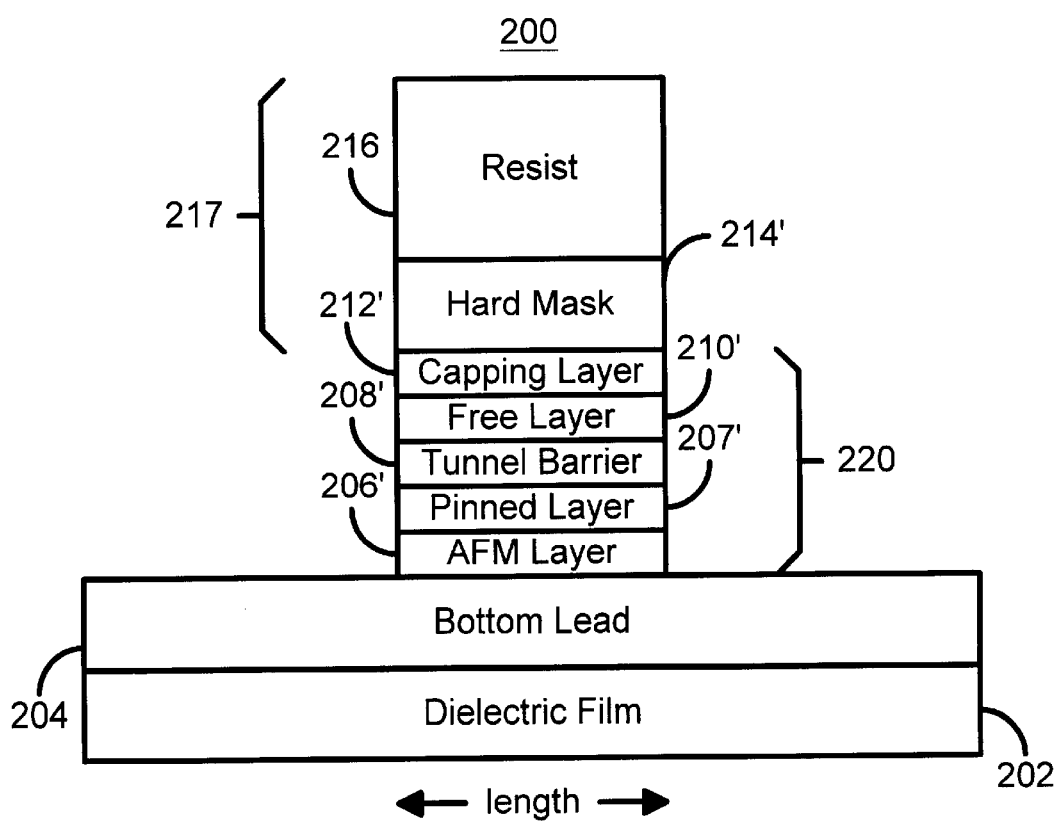
Figure 5E:
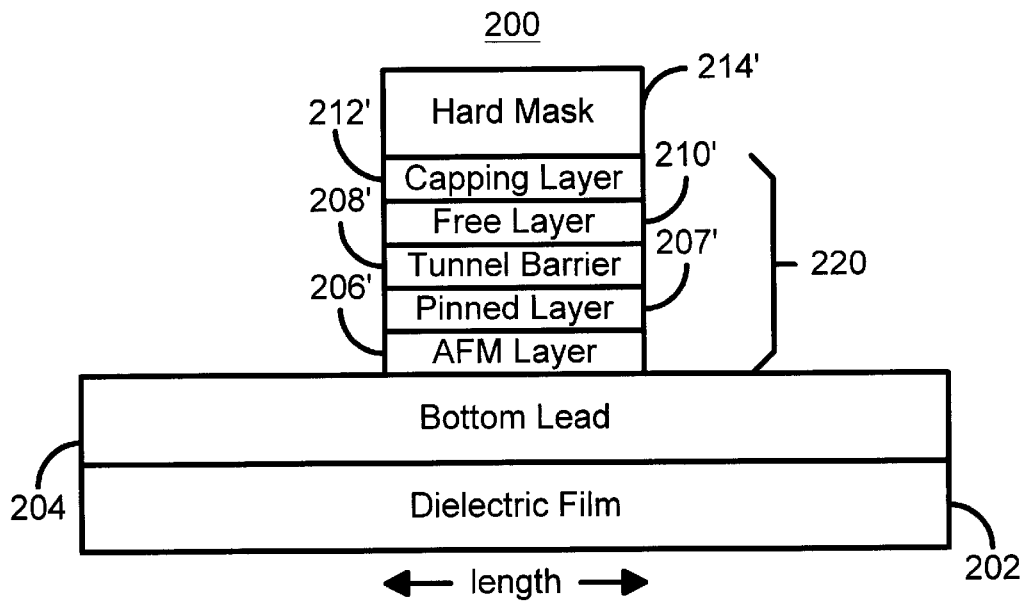
Figure 5F:
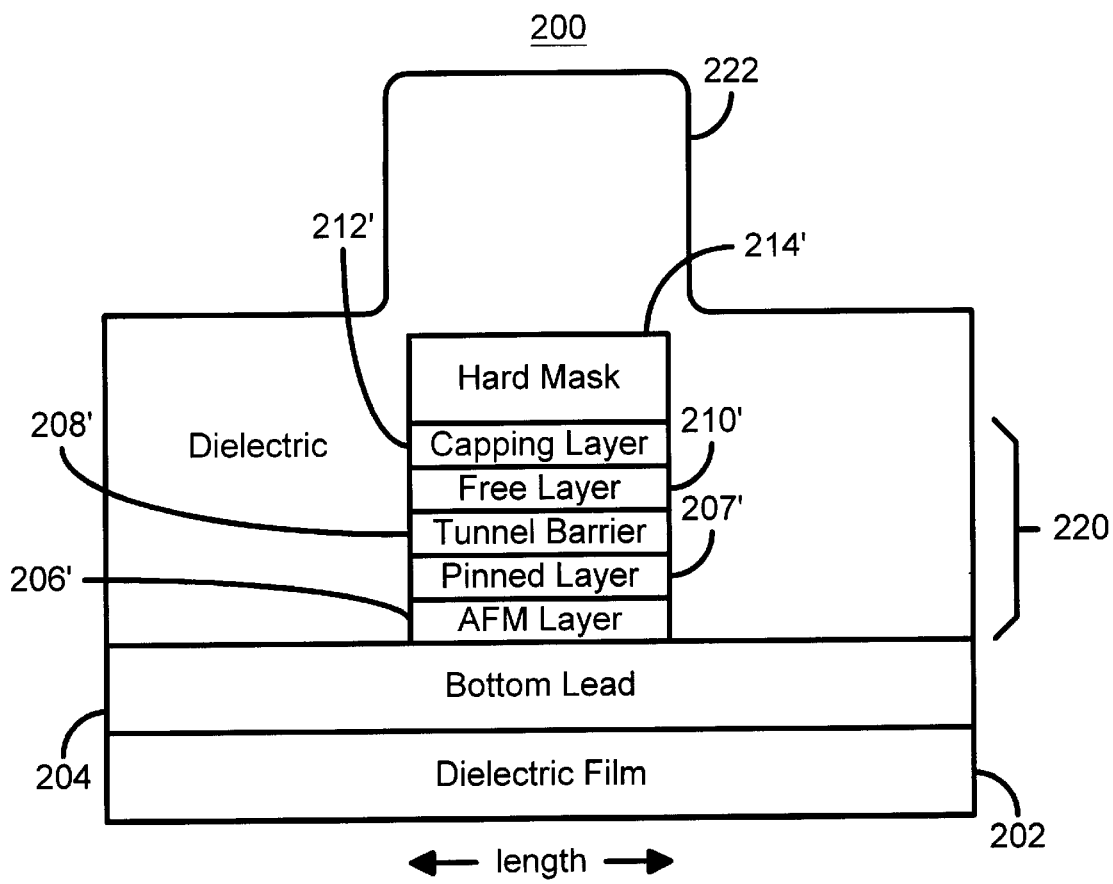

The TMR layers 206, 207, 208 and 210 are etched to provide the TMR sensor, via step 130. Step 130 is preferably performed using a reactive ion etch or ion milling. FIG. 5D depicts the TMR structure 200 after step 130 is performed. Thus, the TMR sensor 220 has been formed. The photoresist structure 216 is removed, via step 132. FIG. 5E depicts the TMR structure 200 after removal of the photoresist structure 216. Thus, the bottom lead 204 and the perimeter surface of the TMR sensor 220 are exposed. A dielectric is provided, via step 134. FIG. 5F depicts the TMR structure 200 after deposition of the dielectric 222. The dielectric 222 preferably covers the bottom lead 204 as well as the TMR sensor 220.

Figure 5G:
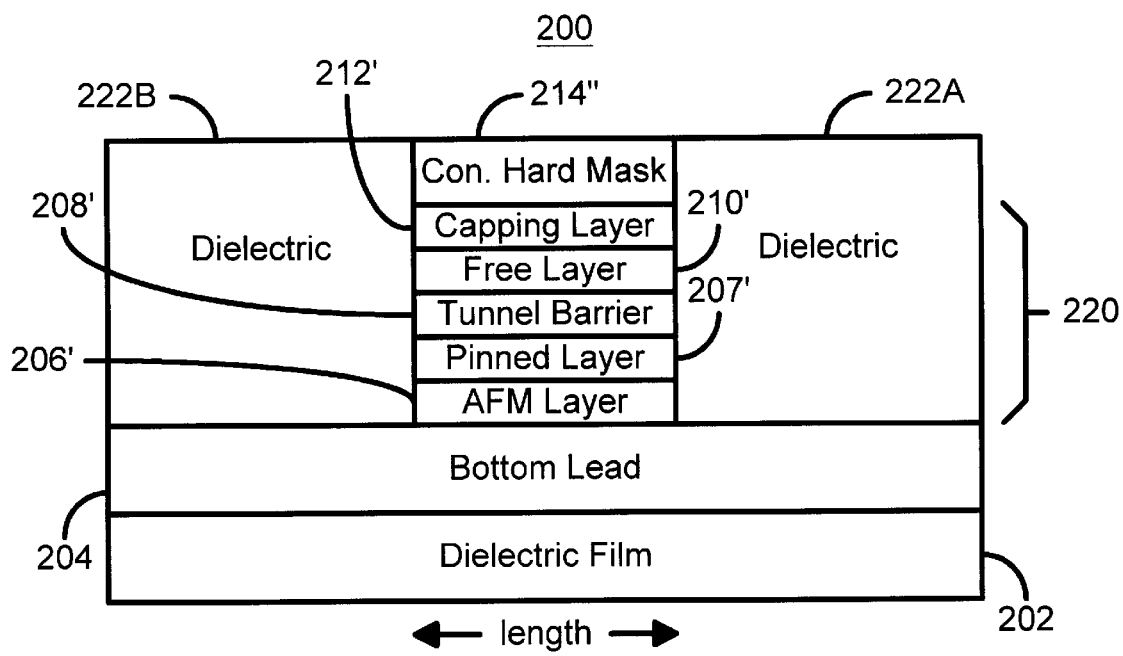
Figure 5H:
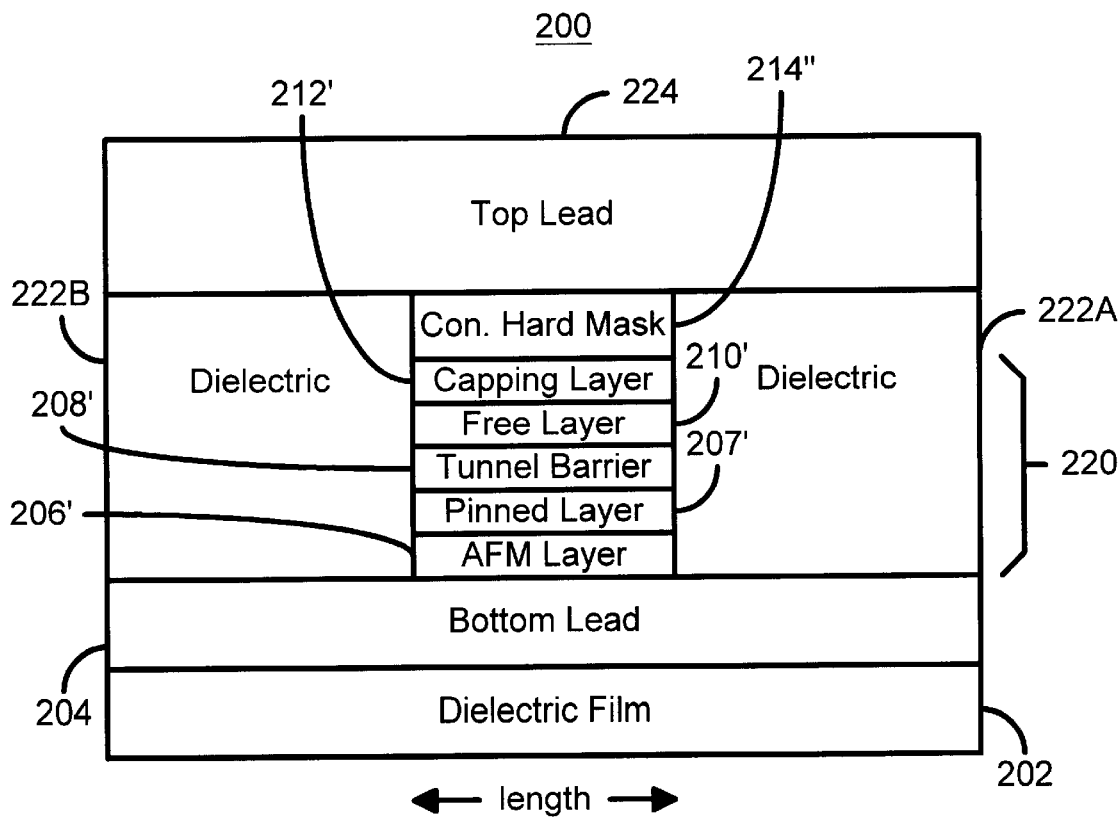

The dielectric 222 is then planarized, via step 136. In a preferred embodiment, step 136 is performed using a chemical mechanical polish ("CMP") step. FIG. 5G depicts the TMR structure 200 after the planarization in step 136. The CMP planarizes the dielectric 222 and removes the portion of the dielectric 222 above the TMR sensor 220. Thus, portions 222A and 222B of the dielectric 222 remain. In general, a portion of the conductive hard mask layer 214' is also removed, leaving layer 214". The top lead, which is preferably a bit line, is provided, via step 138. FIG. 5H depicts the TMR structure 200 after the top lead 224 has been provided.

Because a conductive hard mask 214' is used, the hard mask 214" need not be removed before the top lead 224 is provided. As a result, processing is simplified. Because the conductive hard mask is provided in step 124 and used to define the TMR sensor 220, an undercut bilayer structure is not needed to define the TMR sensor 220. Consequently, smaller TMR sensors can be provided. In a preferred embodiment, the TMR sensor 220 provided is less than 0.2 $\mu$m in length. The TMR sensors 220 can thus be more densely packed in a memory array. Consequently, more data can be stored in a region of a given size of a memory array using the TMR sensor 220. This is achieved without the drop in yield and problems due to ESD and particle contamination encountered when a conventional lift-off process using a bilayer PMGI and photoresist structure is used.

Figure 6:
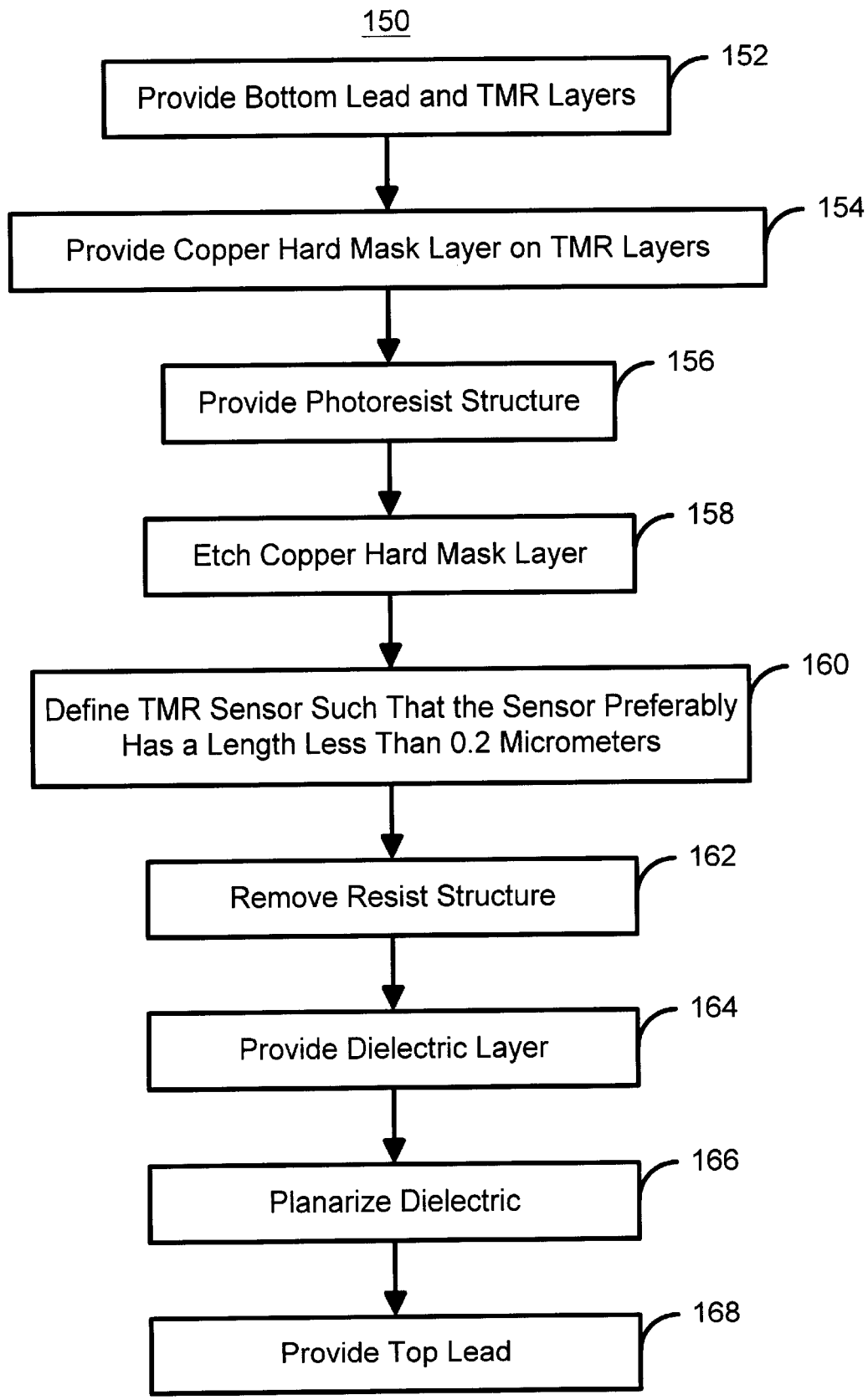
FIG. 6 is a more detailed flow chart depicting a second embodiment of a method in accordance with the present invention for providing a TMR sensor.
Figure 7A:
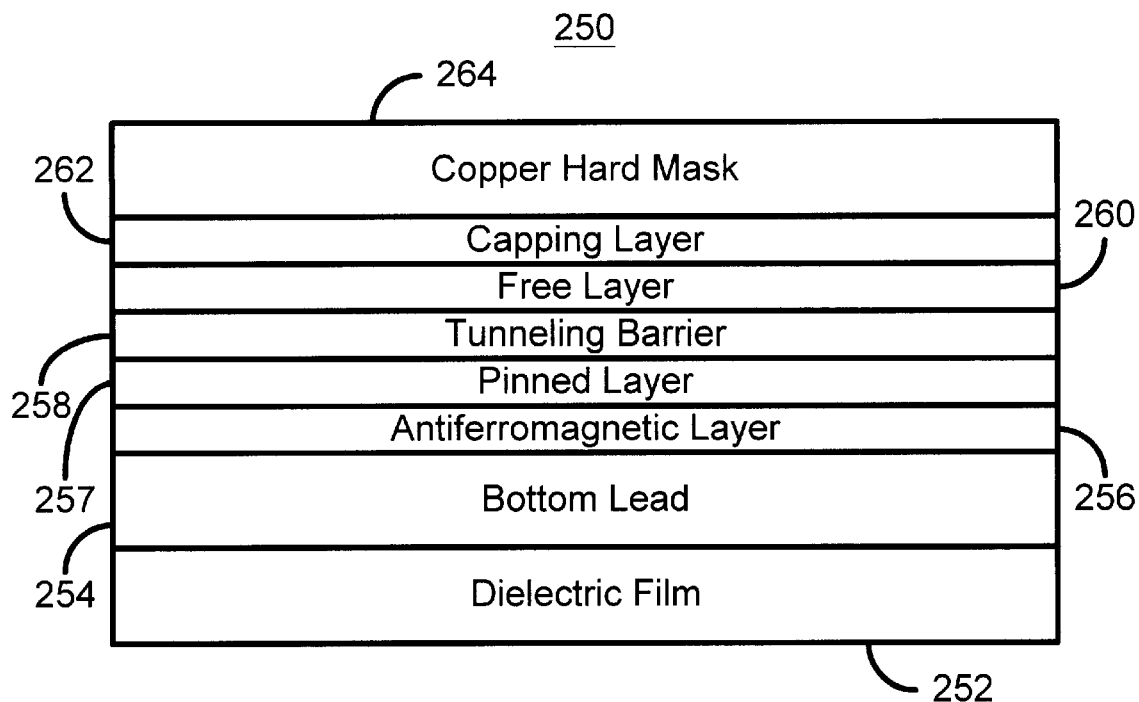
FIGS. 7A–7H depict a second embodiment of a TMR sensor in accordance with the present invention during fabrication.

FIG. 6 is a more detailed flow chart depicting a second embodiment of a method 150 in accordance with the present invention for providing a TMR sensor. FIGS. 7A–7E depict a second embodiment of a TMR structure 250 in accordance with the present invention during fabrication using the method 150. The bottom lead and the TMR layers are provided, via step 152. A copper hard mask layer is provided, via step 154. FIG. 7A depicts a preferred embodiment of the TMR structure 250 in accordance with the present invention after step 154 is performed. The TMR layers are formed on a bottom lead 254 that preferably resides on a dielectric film 252. The TMR layers include at least an antiferromagnetic layer 256, a pinned layer 257 adjacent to the antiferromagnetic layer 256, a free layer 260 and an insulating tunneling barrier 258 between the pinned layer 257 and the free layer 260. The pinned layer 257 and the free layer 260 are preferably ferromagnetic. In addition, a capping layer 262 is provided at the top of the TMR layers. The capping layer is preferably Ta or TaN. A copper hard mask 264 is provided on the capping layer 262.

Figure 7B:
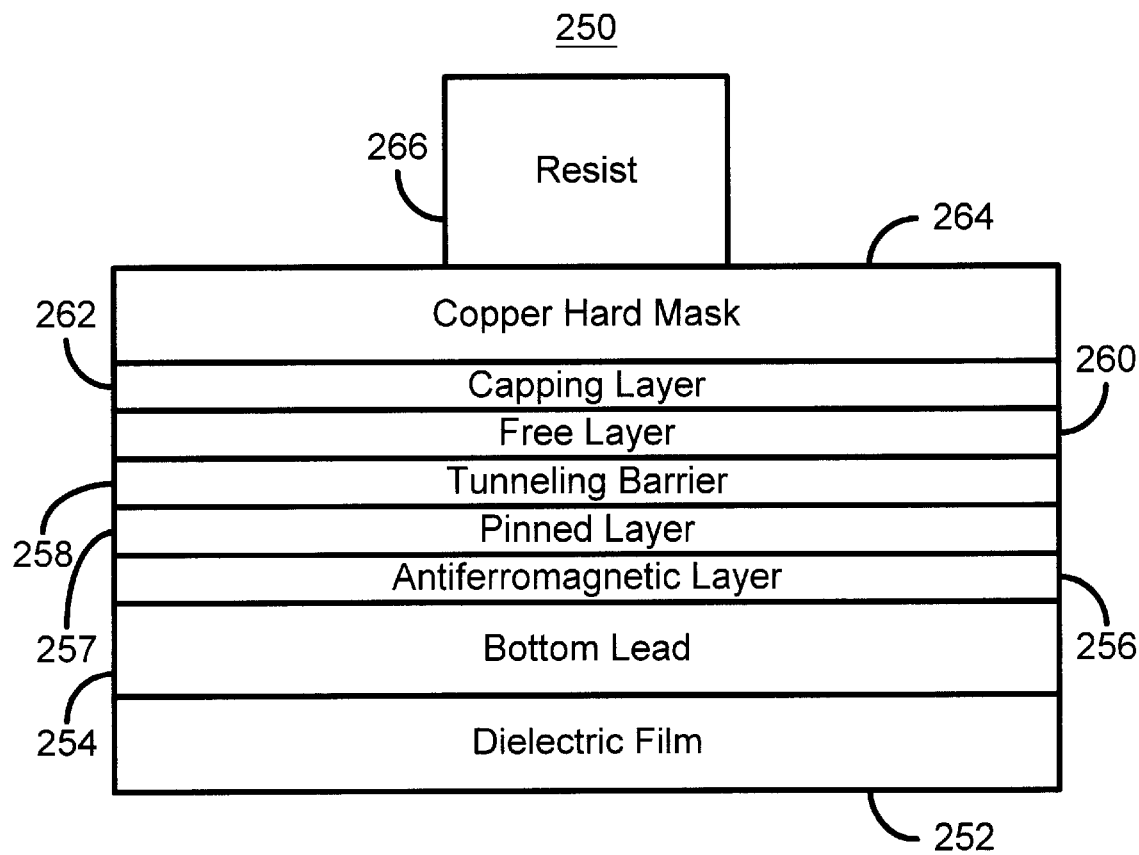
Figure 7C:
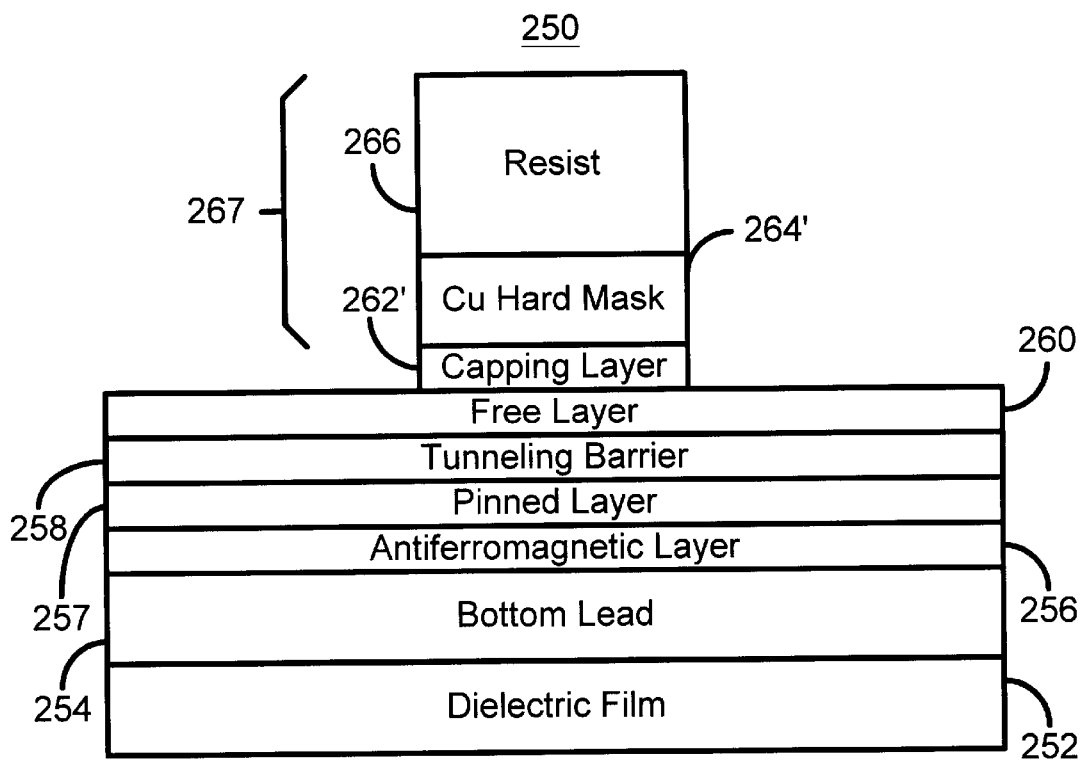

A photoresist structure is provided on the copper hard mask layer, via step 156. FIG. 7B depicts the TMR structure 250 after the photoresist structure 266 is provided. The photoresist structure 266 is preferably the size desired for providing the TMR sensor. Thus, in a preferred embodiment, the photoresist structure 266 is less than 0.2 μm in length. The copper hard mask layer is then etched using the photoresist structure 266 as a mask, via step 158. FIG. 7C depicts the TMR structure 250 after step 158 has been performed. Thus, a bilayer structure 267 formed from the photoresist 266 and the remaining copper hard mask 264' is provided. However, the bilayer structure 267 need not be undercut. Instead the photoresist 266' and the copper hard mask 264' have approximately the same length. In a preferred embodiment, the capping layer 262' is also etched in step 158.

Figure 7D:
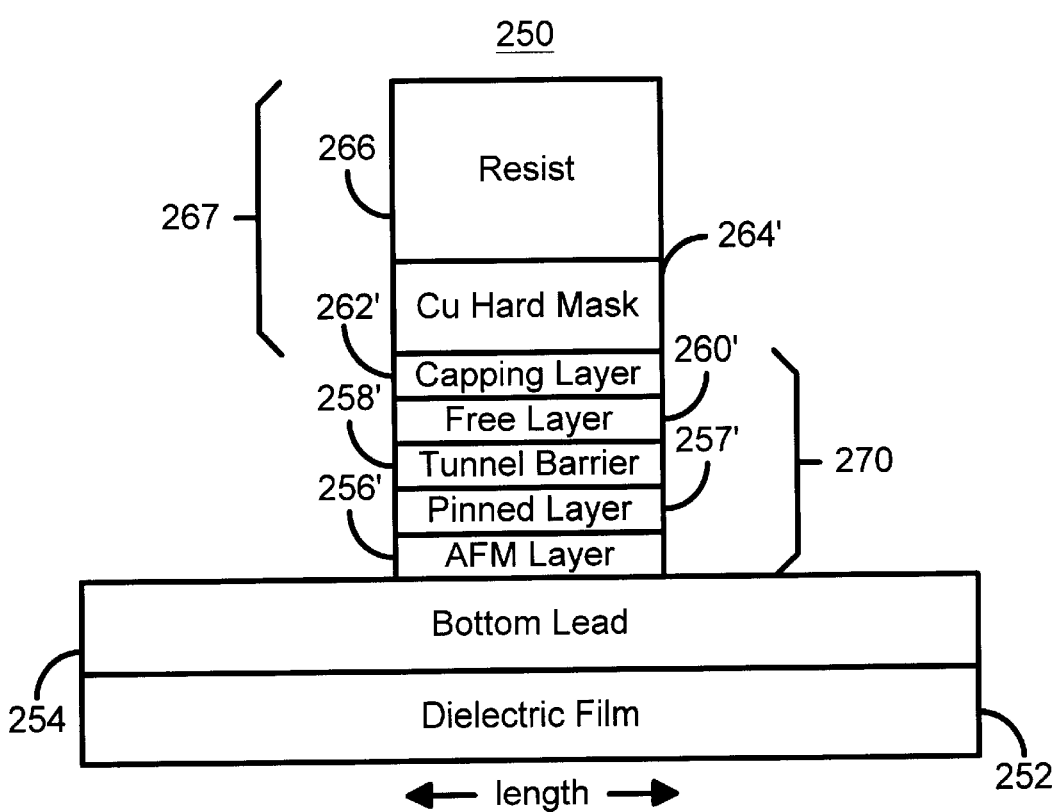
Figure 7E:
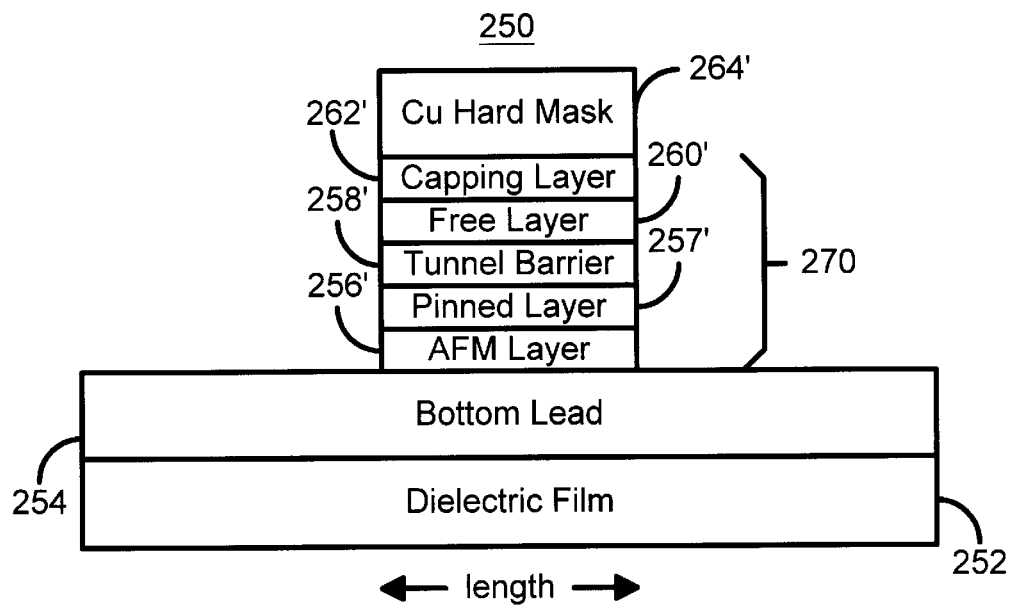
Figure 7F:
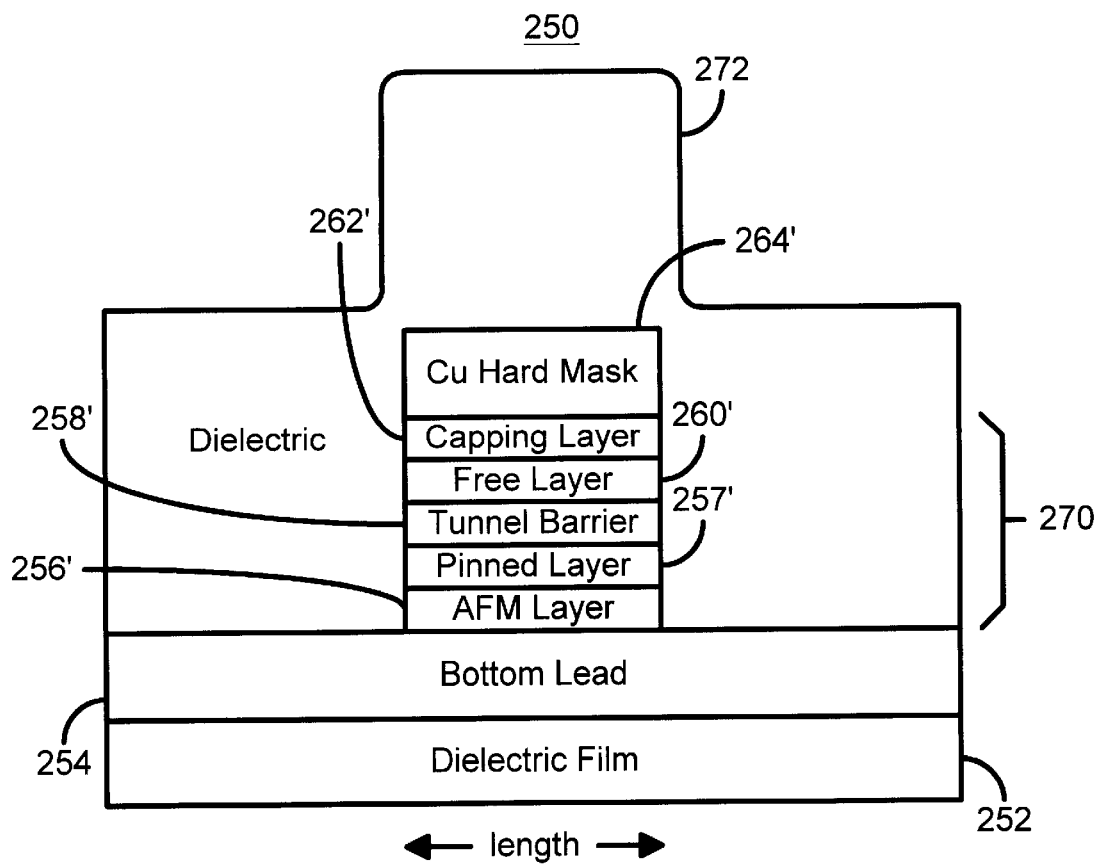

The TMR layers 256, 257, 258 and 260 are etched to provide the TMR sensor, via step 160. FIG. 7D depicts the TMR structure 250 after step 160 is performed. Thus, the TMR sensor 270 has been formed. The photoresist structure 266 is removed, via step 162. FIG. 7E depicts the TMR structure 250 after removal of the photoresist structure 266. Thus, the bottom lead 254 and the perimeter surface of the TMR sensor 270 are exposed. A dielectric is provided, via step 164. FIG. 7F depicts the TMR structure 250 after deposition of the dielectric 272. The dielectric 272 preferably covers the bottom lead 254 as well as the TMR sensor 270.

Figure 7G:
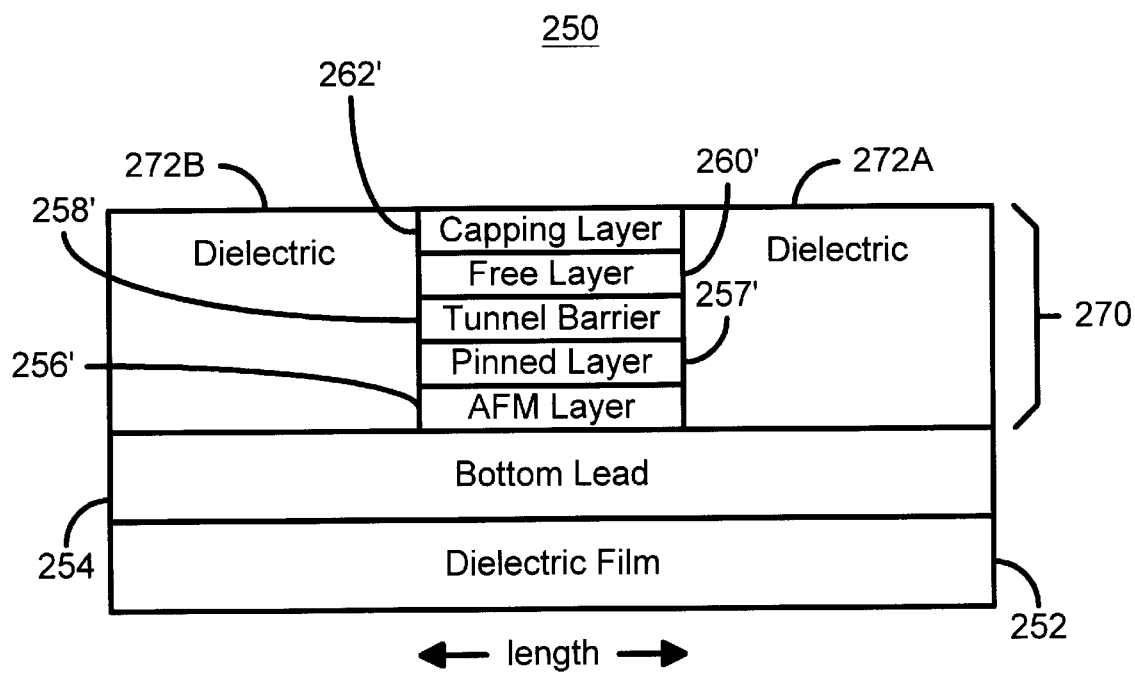
Figure 7H:
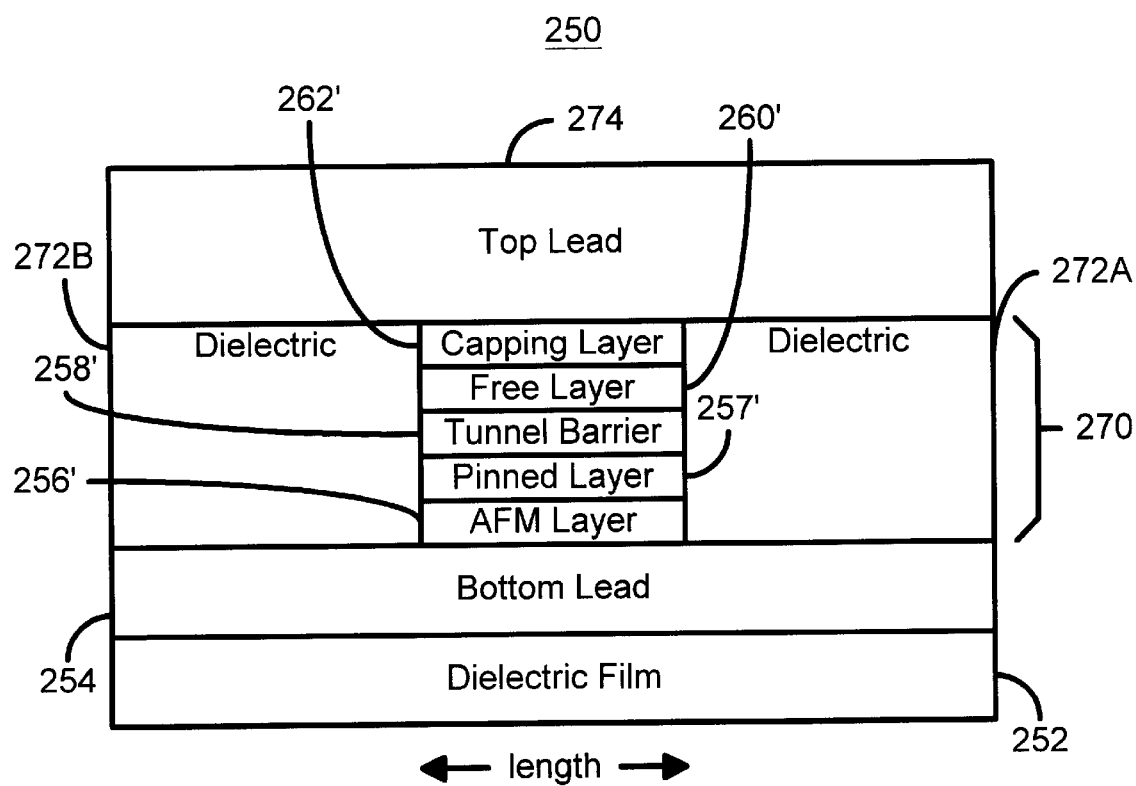

The dielectric 272 is then planarized, via step 166. In a preferred embodiment, step 166 is performed using a CMP step. FIG. 7G depicts the TMR structure 250 after step 166 has been performed. The CMP planarizes the dielectric 272 and removes the portion of the dielectric 272 above the TMR sensor 270. Thus, portions 272A and 272B of the dielectric 272 remain. In general, all of the copper hard mask layer 264' is also removed in the CMP step. The copper hard mask layer 264' is typically removed because copper is soft in comparison to the capping layer 262'. As a result, it is relatively simple to stop the CMP step when the copper hard mask layer 264' has been removed. In other words, the capping layer 262, which is preferably Ta or TaN, can also serve as a stopping layer for the CMP. The top lead, which is preferably a bit line, is provided, via step 168. FIG. 7H depicts the TMR structure 250 after the top lead 274 has been provided.

Because a copper hard mask 264' is used, the CMP 166 is relatively easily performed without etching through the capping layer 262'. Thus, the dielectric 272 can be planarized without fear of damaging the TMR sensor 270. As a result, processing is simplified. Because the copper hard mask 264' is used to define the TMR sensor 270, an undercut bilayer structure is not needed to define the TMR sensor 270. Consequently, smaller TMR sensors can be provided. In a preferred embodiment, the TMR sensor 270 is less than 0.2 μm in length. The TMR sensors 270 can, therefore, be more densely packed in a memory array. Consequently, more data can be stored in a region of a given size in a memory array using the TMR sensor 270 and a more dense memory array can be provided. This is achieved without the drop in yield and problems due to ESD and particle contamination encountered when a conventional lift-off process using a bilayer PMGI and photoresist structure is used.

Figure 8:
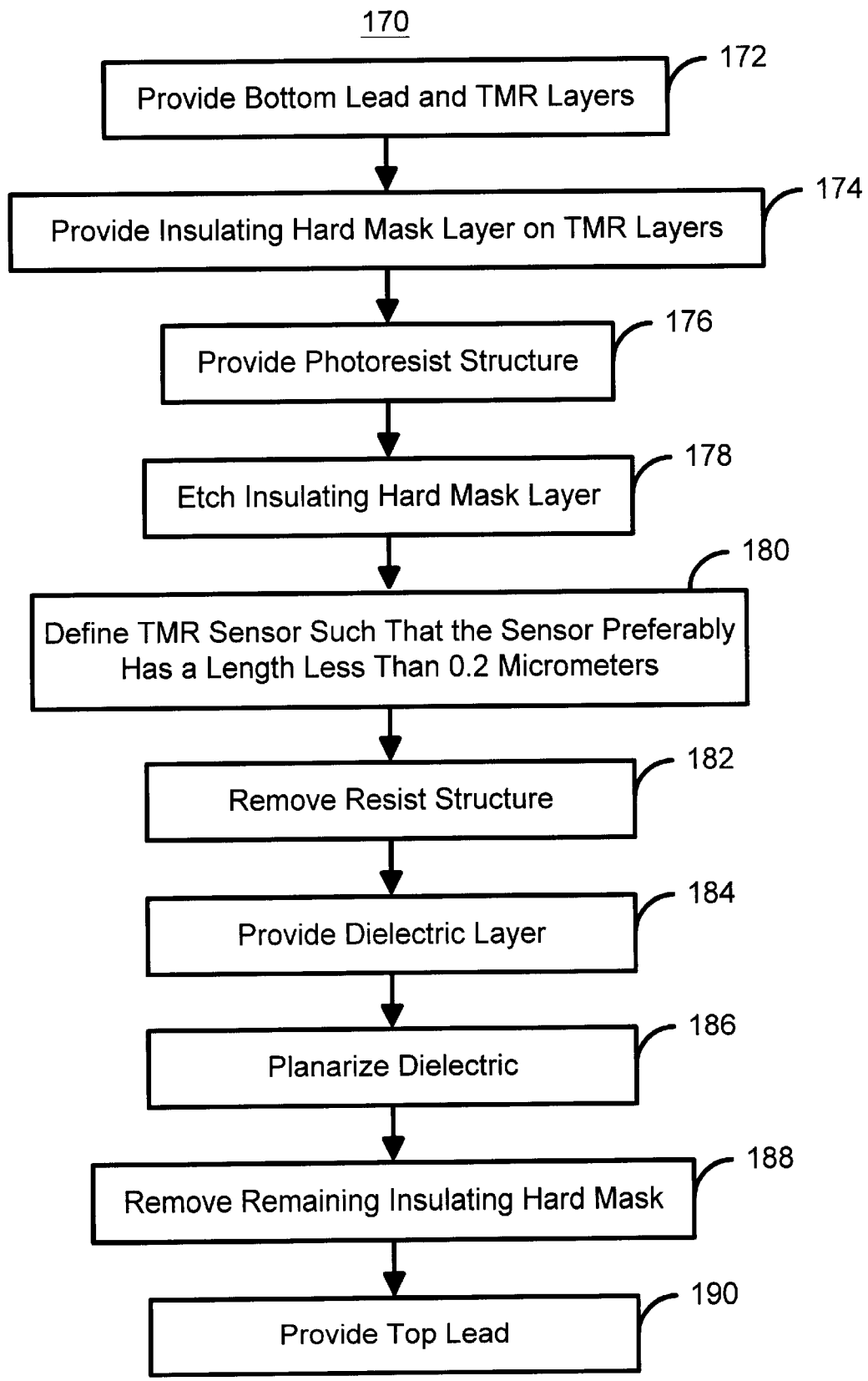
FIG. 8 is a more detailed flow chart depicting a third embodiment of a method in accordance with the present invention for providing a TMR sensor.
Figure 9A:
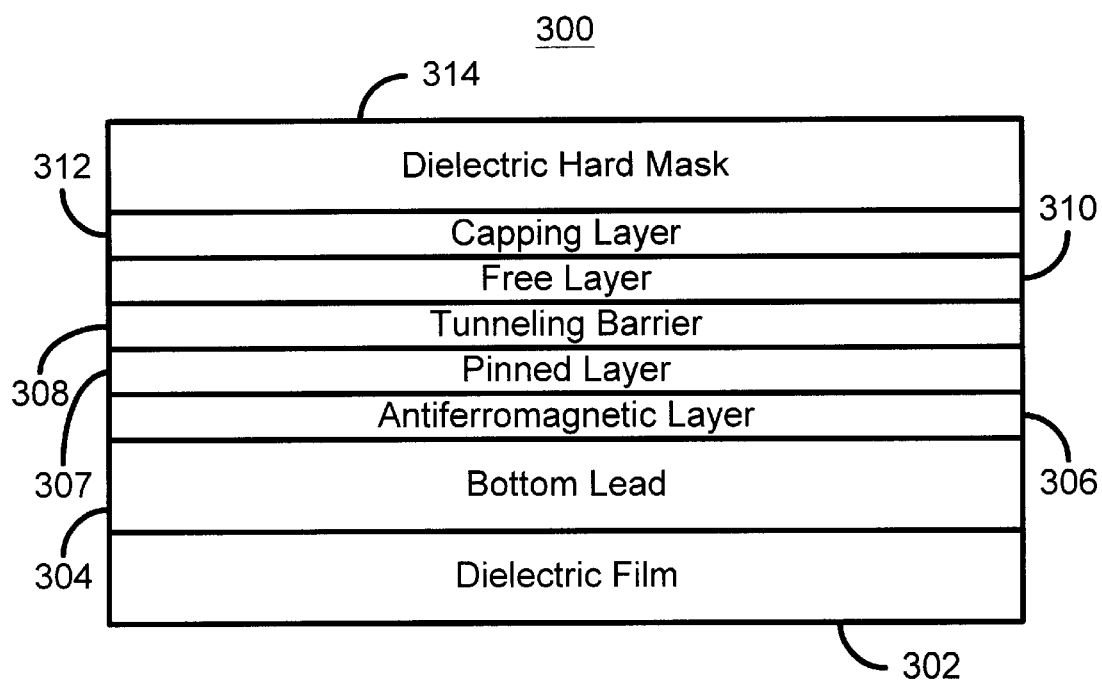
FIGS. 9A–9I depict a third embodiment of a TMR sensor in accordance with the present invention during fabrication.

FIG. 8 is a more detailed flow chart depicting a third embodiment of a method 170 in accordance with the present invention for providing a TMR sensor. FIGS. 9A–9E depict a third embodiment of a TMR structure 300 in accordance with the present invention during fabrication. The bottom lead and the TMR layers are provided, via step 172. A dielectric hard mask layer is provided, via step 174. FIG. 9A depicts a preferred embodiment of the TMR structure 300 in accordance with the present invention after step 174 is performed. The TMR layers are formed on a bottom lead 304 that preferably resides on a dielectric film 302. The TMR layers include at least an antiferromagnetic layer 306, a pinned layer 307 adjacent to the antiferromagnetic layer 306, a free layer 310 and an insulating tunneling barrier 308 between the pinned layer 307 and the free layer 310. The pinned layer 307 and the free layer 310 are preferably ferromagnetic. In addition, a capping layer 312 is provided at the top of the TMR layers. A dielectric hard mask 314 is provided on the capping layer 312. The dielectric hard mask 314 is preferably composed of $SiO_2$.

Figure 9B:
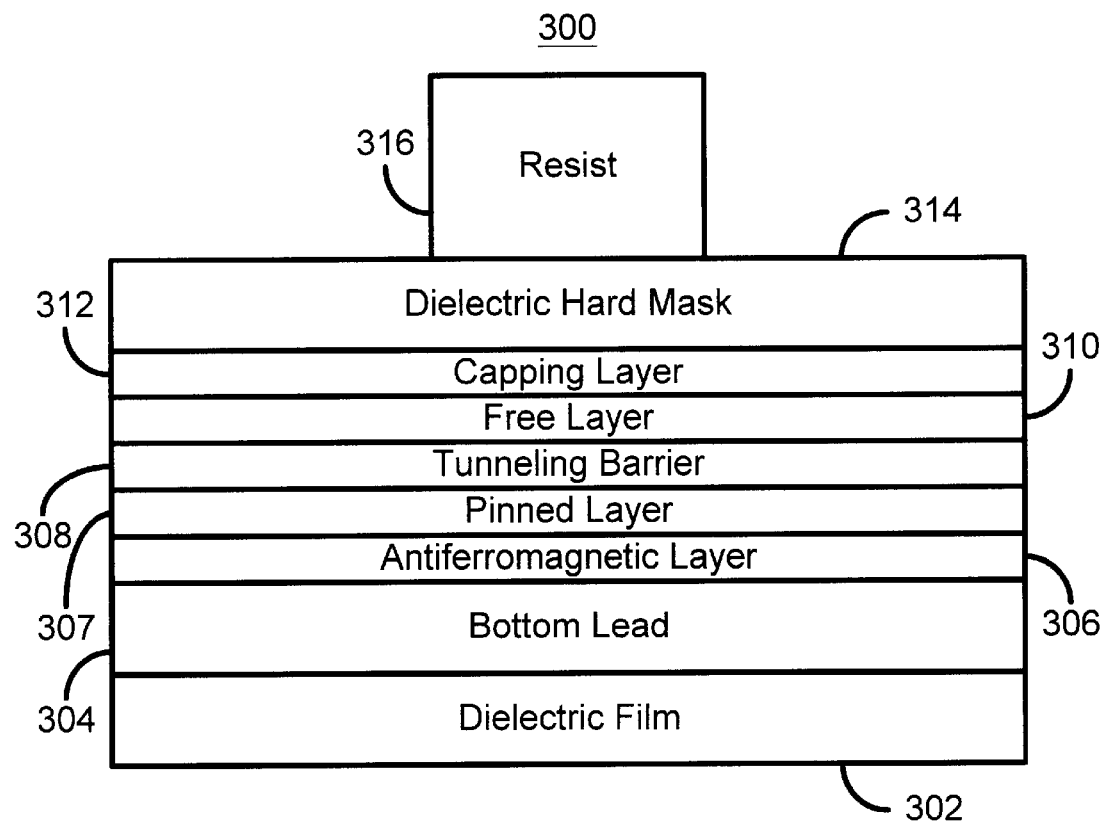
Figure 9C:
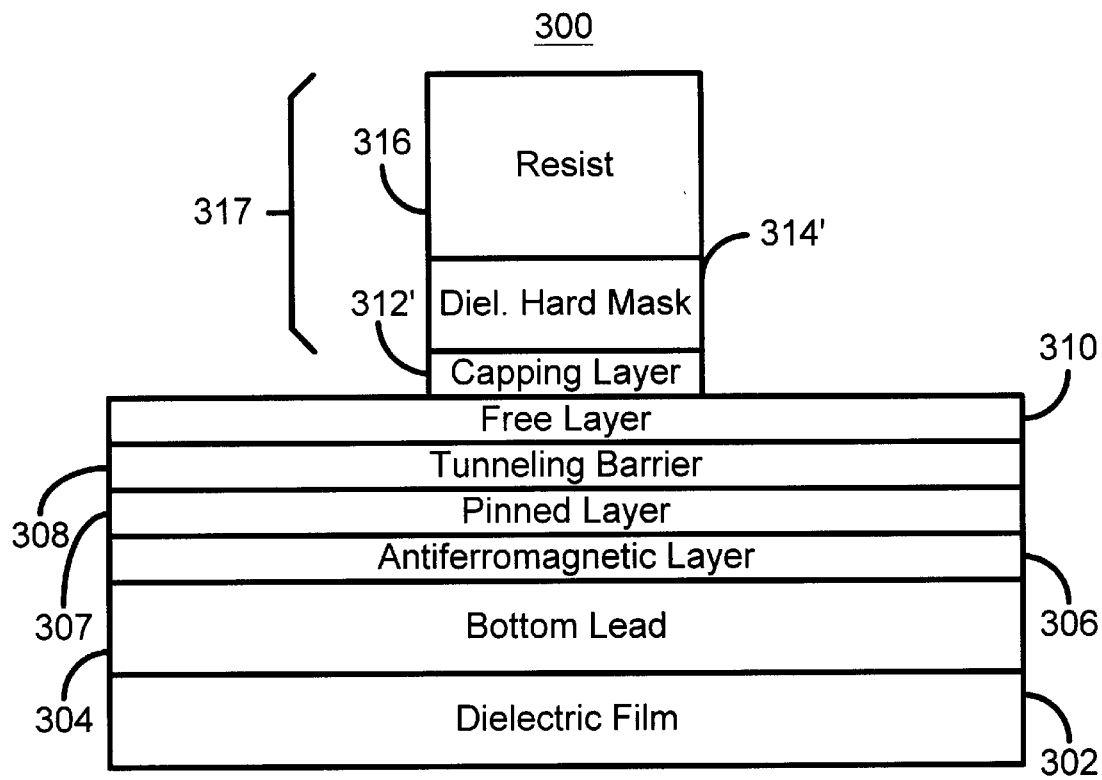

A photoresist structure is provided on the dielectric hard mask layer 312, via step 176. FIG. 9B depicts the TMR structure 300 after the photoresist structure 316 is provided. The photoresist structure 316 is preferably the size desired for providing the TMR sensor. Thus, in a preferred embodiment, the photoresist structure 316 is less than 0.2 μm in length. The dielectric hard mask layer is then etched using the photoresist structure 316 as a mask, via step 178. FIG. 9C depicts the TMR structure 300 after step 178 has been performed. Thus, a bilayer structure 317 formed from the photoresist 316' and the remaining dielectric hard mask 314' is provided. However, the bilayer structure 317 need not be undercut. Instead the photoresist 316 and the dielectric hard mask 314' have approximately the same length. In a preferred embodiment, the capping layer 312' is also etched in step 178.

Figure 9D:
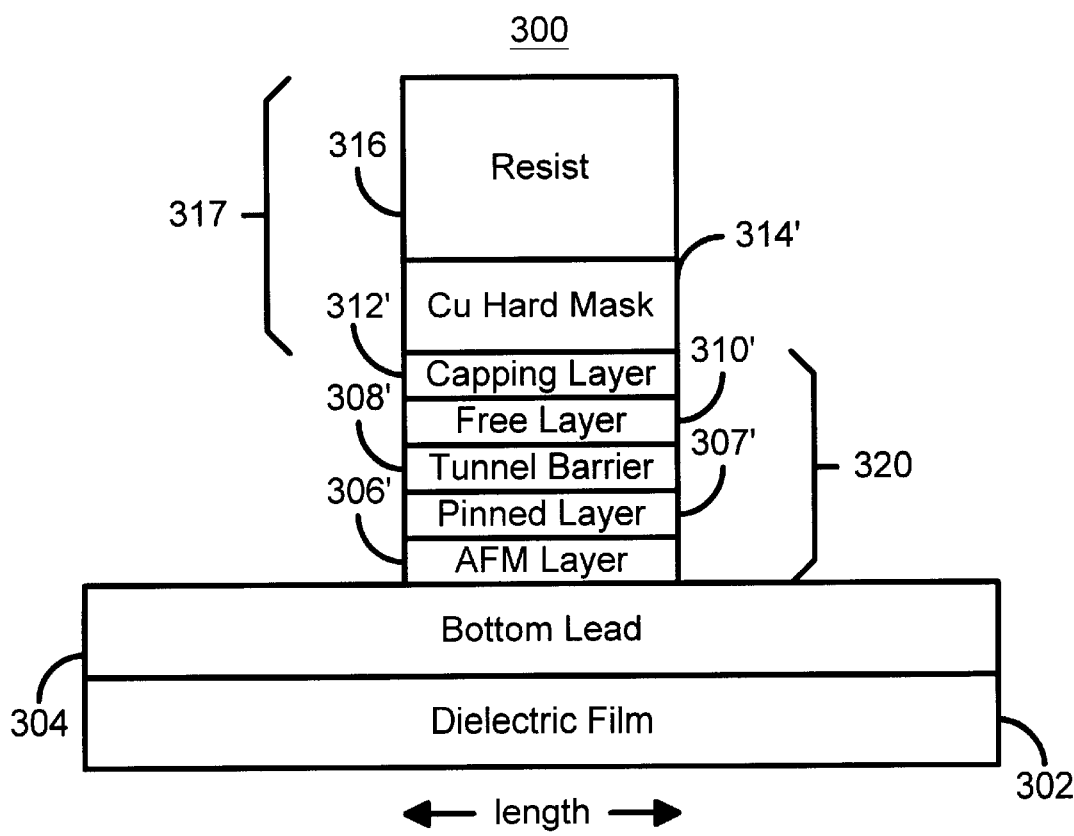
Figure 9E:
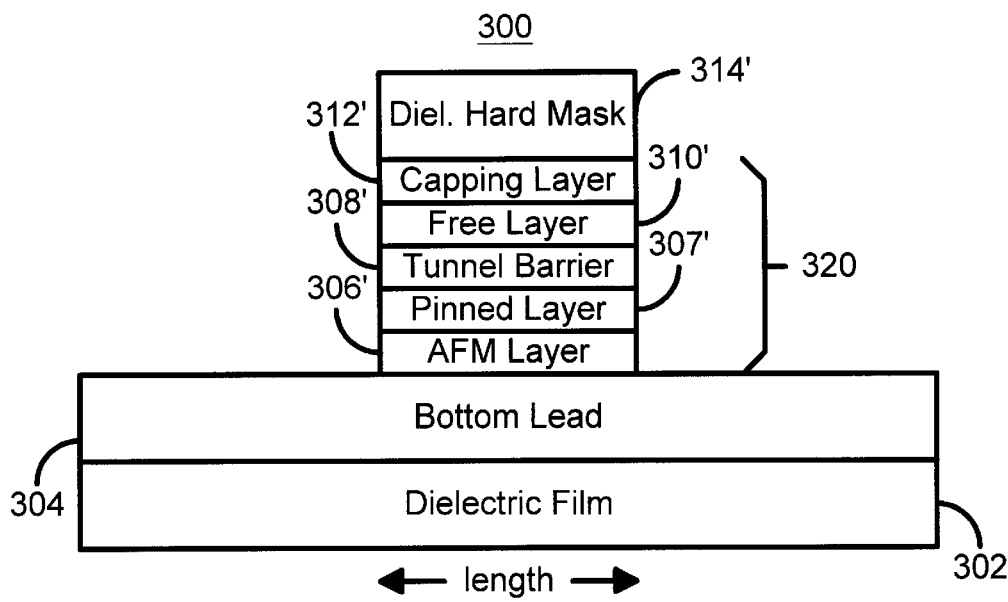
Figure 9F:
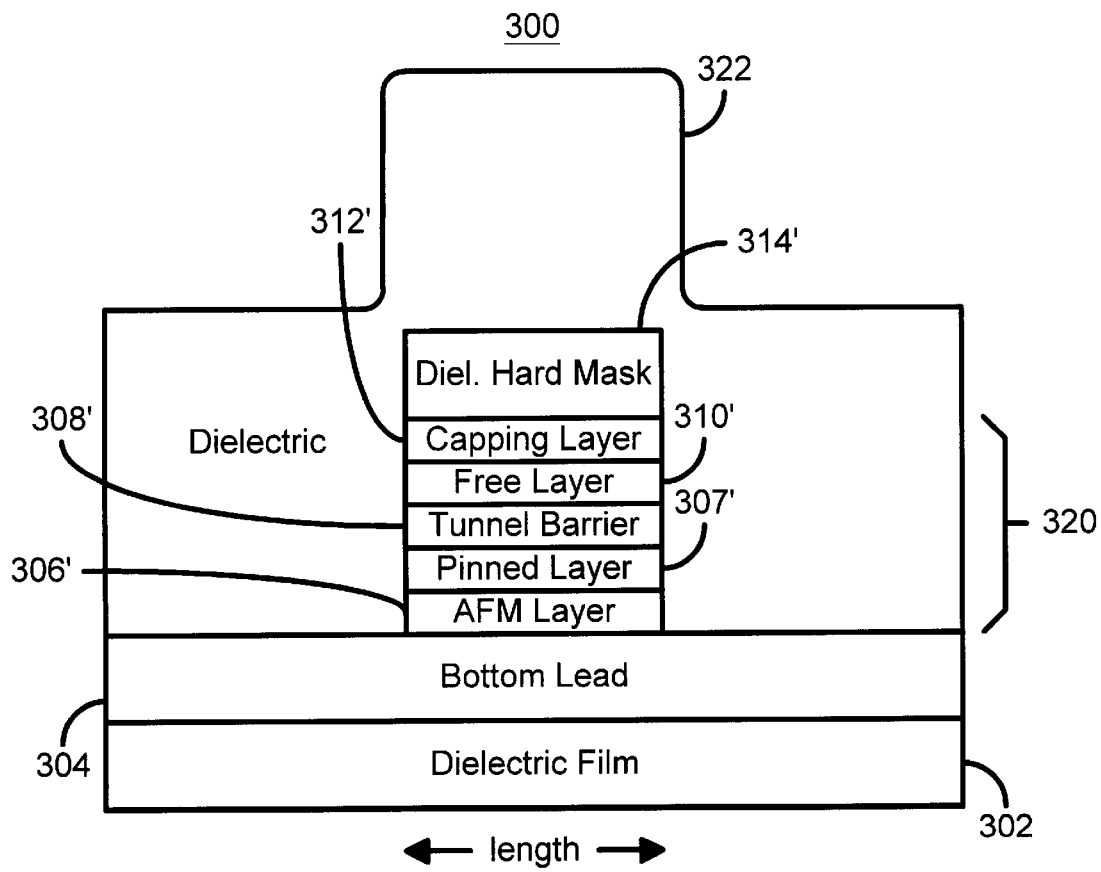

The TMR layers 306, 307, 308 and 310 are etched to provide the TMR sensor, via step 180. FIG. 9D depicts the TMR structure 300 after step 180 is performed. Thus, the TMR sensor 320 has been formed. The photoresist structure 316 is removed, via step 182. FIG. 9E depicts the TMR structure 300 after removal of the photoresist structure 316. Thus, the bottom lead 304 and the perimeter surface of the TMR sensor 320 are exposed. A dielectric is provided, via step 184. FIG. 9F depicts the TMR structure 300 after deposition of the dielectric 322. The dielectric 322 preferably covers the bottom lead 304 as well as the TMR sensor 320.

Figure 9G:
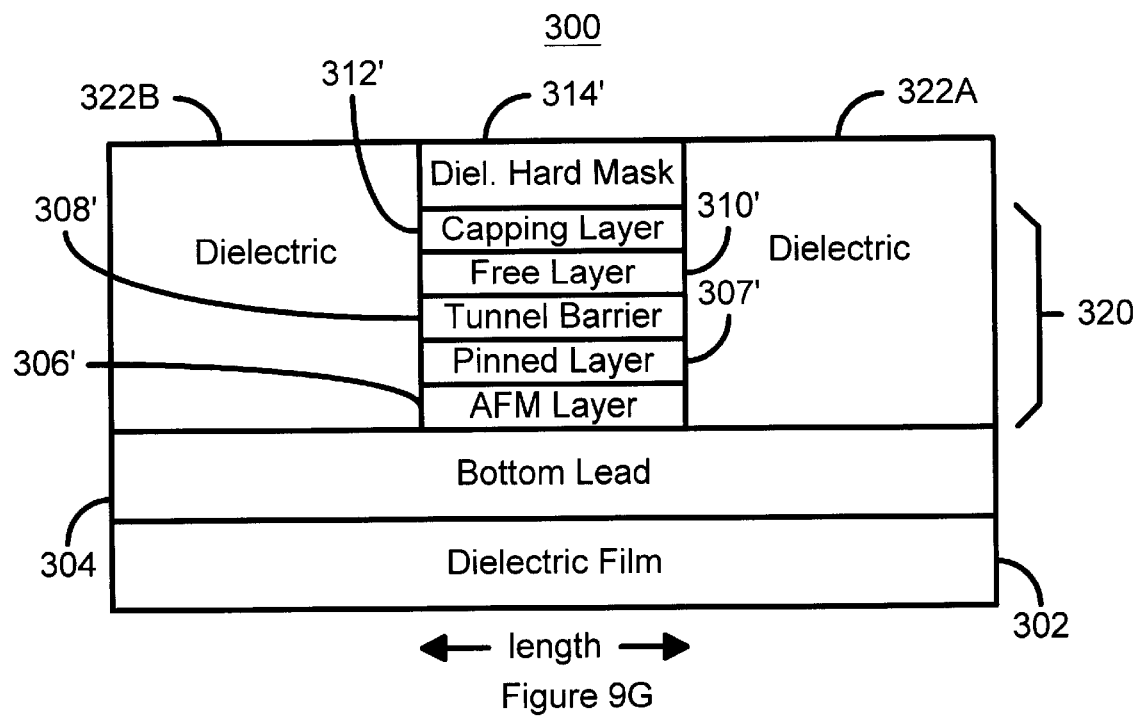
Figure 9H:
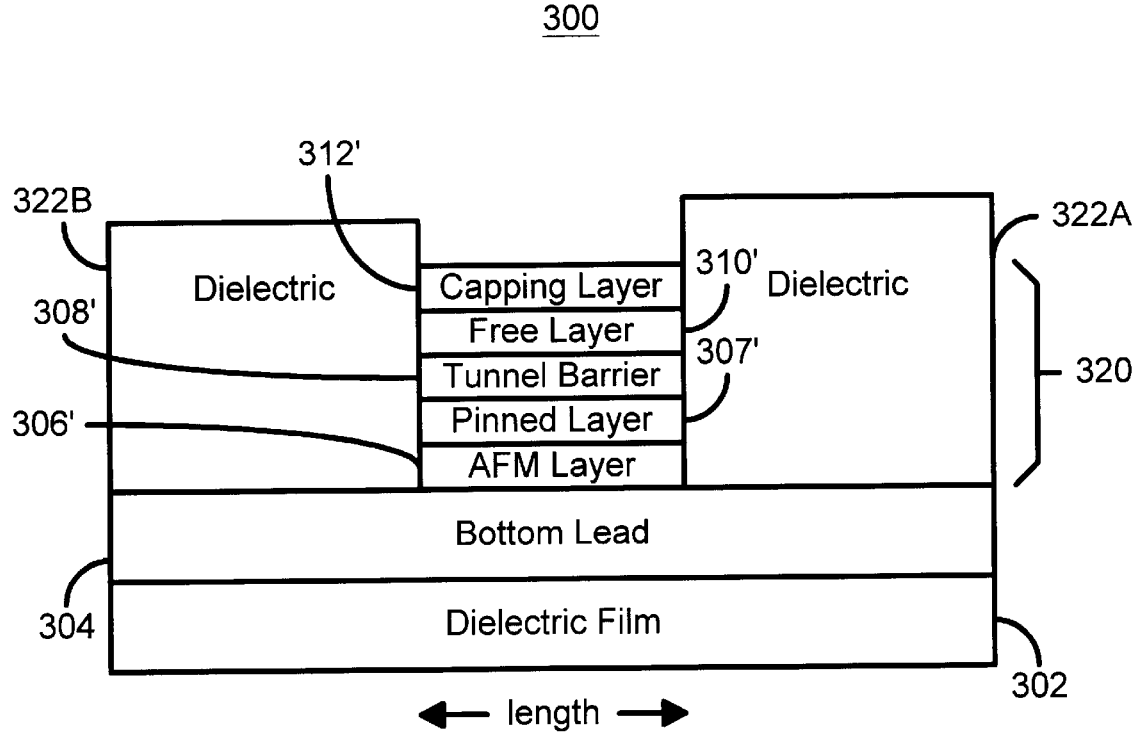
Figure 9I:
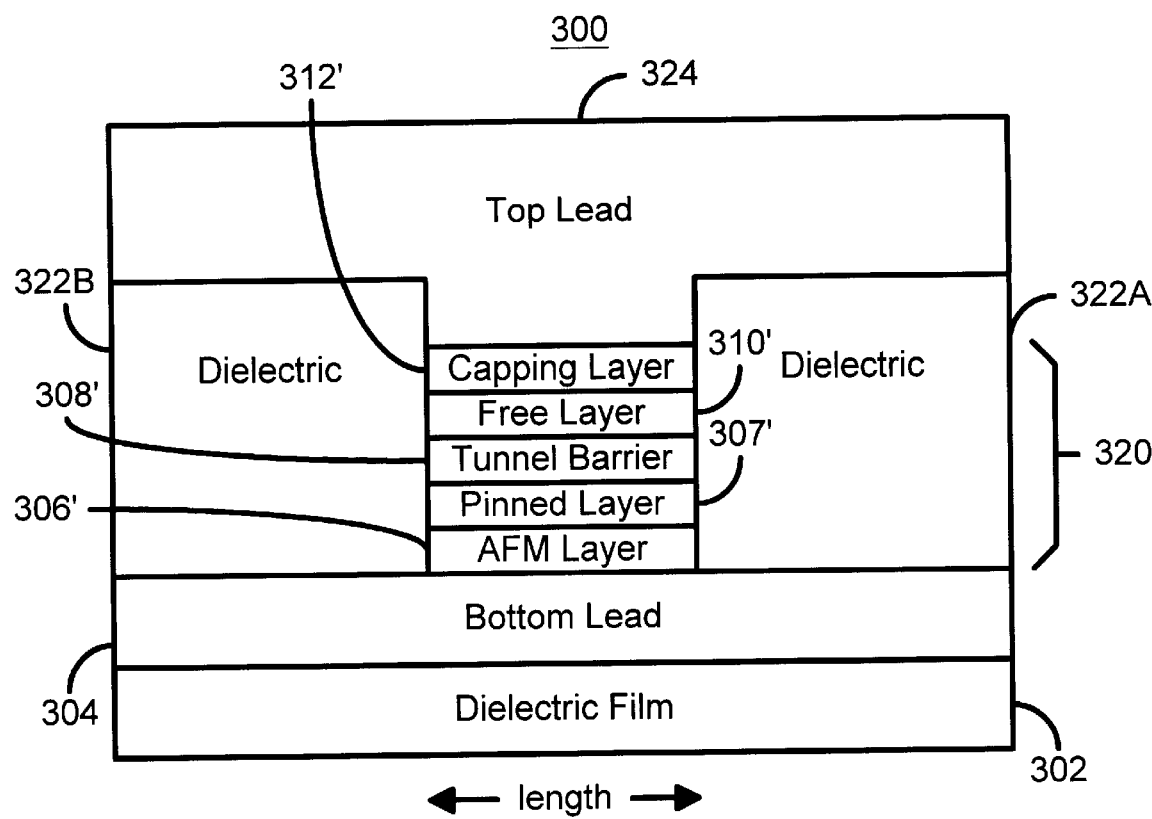

The dielectric 322 is then planarized, via step 186. In a preferred embodiment, step 186 is performed using a CMP step. FIG. 9G depicts the TMR structure 300 after step 186 has been performed. The CMP planarizes the dielectric 322 and removes the portion of the dielectric 322 above the TMR sensor 320. Thus, portions 322A and 322B of the dielectric 322 remain. In general, portion of the dielectric hard mask layer 314' is also removed in the CMP step, leaving portion 314" of the dielectric hard mask layer. Because electrical contact is to be made to the TMR sensor 320, the remaining portion of the dielectric hard mask 314" is removed, via step 188. FIG. 9H depicts the TMR structure 300 after step 188 has been performed. The top lead, which is preferably a digit line, is provided, via step 190. FIG. 9I depicts the TMR structure 300 after the remaining portion of the dielectric hard mask layer 314" has been removed and the top lead 324 has been provided.

Because the dielectric hard mask 314' is used to define the TMR sensor 320, an undercut bilayer structure is not needed to define the TMR sensor 320. Consequently, smaller TMR sensors 320 can be provided. In a preferred embodiment, the TMR sensor 320 is less than 0.2 $\mu$m in length. The TMR sensors 270 can, therefore, be used in a higher density memory array. Consequently, more data can be stored in a region of a given size in a memory array using the TMR sensor 270. This is achieved without the drop in yield, ESD damage and particle contamination encountered when a conventional lift-off process using a bilayer PMGI and photoresist structure is used.

Thus, the use of a hard mask layer in fabricating TMR sensors allows for smaller TMR sensors to be defined. The use of smaller TMR sensors allows higher density memory arrays to be achieved. In addition, the use of the hard mask layer need not make processing of the TMR sensor more difficult. Consequently, smaller TMR sensors may be achieved without substantially changing or complicating fabrication of the TMR sensor.

A method and system has been disclosed for providing a TMR sensor that could be used in a more dense magnetic memory array. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A tunneling magnetoresistive sensor comprising:
    a pinned layer, the pinned layer being a first ferromagnetic layer;
    a free layer, the free layer being a second ferromagnetic layer; and
    an insulating layer between the pinned layer and the free layer;
    wherein the pinned layer, the free layer and the insulating layer have a less than 0.2 $\mu$m minimum dimension in a plane of the free layer, the pinned layer, and the insulating layer.

2. The tunneling magnetoresistive sensor of claim 1 further comprising:
    a hard mask layer residing at the top of the tunneling magnetoresistive sensor, the hard mask layer being conductive.

3. The tunneling magnetoresistive sensor of claim 2 further comprising:
    a capping layer at the top of the tunneling magnetoresistive sensor; and
    a copper hard mask layer residing on the capping layer.

4. The tunneling magnetoresistive sensor of claim 3 wherein the capping layer includes Ta or TaN.

5. The tunneling magnetoresistive sensor of claim 1 wherein the tunneling magnetoresistive sensor includes a first edge, a second edge and a thickness;
    wherein a dielectric resides at the first and the second edge and is higher than the thickness of the tunneling magnetoresistive sensor.

6. A method for providing a tunneling magnetoresistive sensor comprising the steps of:
    (a) providing a pinned layer, the pinned layer being a first ferromagnetic layer;
    (b) providing a free layer, the free layer being a second ferromagnetic layer;
    (c) providing an insulating layer between the pinned layer and the free layer; and
    (d) providing a hard mask layer at the top of the tunneling magnetoresistive sensor, the hard mask layer being used in defining the tunneling magnetoresistive sensor;
    (e) using the hard mask layer to define a length of the tunneling magnetoresistive sensor in a plane of the free layer, the pinned layer, and the insulating layer;
    wherein the pinned layer, the free layer and the insulating layer are capable of having a less than 0.2 $\mu$m minimum dimension for the length.

7. The method of claim 6 wherein the hard mask providing step (d) further includes the step of:
    (d1) providing a conductive hard mask layer.

8. The method of claim 7 further comprising the step of:
    (f) a capping layer at the top of the tunneling magnetoresistive sensor; and wherein the conductive hard mask providing step (d1) includes the step of
    (d1i) providing a copper hard mask layer residing on the capping layer.

9. The method of claim 8 wherein the capping layer providing step (e) further includes the step of:
    (f1) providing a layer of including Ta or TaN.

10. The method of claim 8 further comprising the step of:
    (g) removing the copper hard mask layer after the tunneling magnetoresistive sensor is defined.

11. The method of claim 6 wherein the hard mask layer providing step (d) further includes the step of:
    (d1) providing a dielectric hard mask layer.

12. The method of claim 6 further comprising the step of:
    (f) removing the dielectric hard mask layer after the tunneling magnetoresistive sensor is defined.

* * * * *